US012762207B1

(12) United States Patent
Cyjon et al.

(10) Patent No.: US 12,762,207 B1
(45) Date of Patent: Oct. 13, 2026

(54) INTENT-BASED INTERACTIONS IN SOFTWARE PLATFORMS

(71) Applicant: monday.com Ltd., Tel Aviv (IL)

(72) Inventors: Ronit Cyjon, Tel Aviv (IL); Meytal Badichi, London (GB); Daniel Hai, Ramat HaSharon (IL); Danielle Vertman, Rishon LeZion (IL); Or Fridman, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 19/432,254

(22) Filed: Dec. 24, 2025

Related U.S. Application Data

(63) Continuation of application No. 19/357,153, filed on Oct. 14, 2025, which is a continuation of application
(Continued)

(51) Int. Cl.
*G06F 18/21* (2023.01)
*G06F 3/04842* (2022.01)
(Continued)

(52) U.S. Cl.
CPC ........ *G06F 18/217* (2023.01); *G06F 3/04842* (2013.01); *G06F 8/34* (2013.01);
(Continued)

(58) Field of Classification Search
CPC ......... G06N 3/042; G06F 3/0482; G06F 8/34; G06Q 10/40; H04N 7/157
See application file for complete search history.

(56) References Cited

U.S. PATENT DOCUMENTS 7,076,048 B2 7/2006 Lee et al.
9,576,033 B2 2/2017 Barrett et al.
(Continued)

FOREIGN PATENT DOCUMENTS

CN 105122288 12/2015
CN 116566737 8/2023
(Continued)

OTHER PUBLICATIONS

International Search Report and the Written Opinion Dated Dec. 18, 2024 From the International Searching Authority Re. Application No. PCT/IL2024/050820. (11 Pages).
(Continued)

*Primary Examiner* — Tadesse Hailu

(57) ABSTRACT

Systems and methods for integrating generative artificial intelligence (AI) capabilities within Software as a Service (SaaS) platforms. One of the computer-implemented methods are for querying a generative AI model about structured data in a SaaS environment, enabling users to interact with and manipulate data through AI-assisted interfaces. One of the systems maintains a generative AI agent configured to interact with SaaS platform data as a virtual team member, capable of understanding context and nuances of project data. Also described are methods for color-context aware data analysis, generation of interactive elements in messaging sessions, and cross-application generative AI agent interactions triggered by user mentions. Also described is facilitating the creation of custom SaaS platform products by combining functionalities from existing products using generative AI. The systems and methods represent advancement in AI-driven SaaS customization and data analysis.

20 Claims, 11 Drawing Sheets

Related U.S. Application Data

No. 19/179,092, filed on Apr. 15, 2025, now Pat. No. 12,450,312, which is a continuation of application No. PCT/IL2024/050822, filed on Aug. 14, 2024.

(60) Provisional application No. 63/519,519, filed on Aug. 14, 2023, provisional application No. 63/548,339, filed on Nov. 13, 2023, provisional application No. 63/645,998, filed on May 13, 2024.

(51) Int. Cl.

| | |
|---|---|
| ***G06F 8/34*** | (2018.01) |
| ***G06F 9/451*** | (2018.01) |
| ***G06N 3/042*** | (2023.01) |
| ***G06Q 10/40*** | (2026.01) |
| ***H04N 7/15*** | (2006.01) |

(52) U.S. Cl.

CPC ............. *G06F 9/453* (2018.02); *G06N 3/042* (2023.01); *G06Q 10/40* (2026.01); *H04N 7/157* (2013.01)

(56) References Cited

U.S. PATENT DOCUMENTS

| | | | |
|---|---|---|---|
| 9,965,553 | B2 | 5/2018 | Lyren |
| 10,560,579 | B1 | 2/2020 | Wu et al. |
| 10,904,169 | B2 | 1/2021 | Barve et al. |
| 10,956,300 | B1 | 3/2021 | Yamane et al. |
| 10,956,833 | B1 | 3/2021 | Yamane et al. |
| 11,037,554 | B1 | 6/2021 | Le Chevalier et al. |
| 11,069,001 | B1 | 7/2021 | Mascaro et al. |
| 11,159,457 | B2 | 10/2021 | Liang et al. |
| 11,526,661 | B2 | 12/2022 | Haramati et al. |
| 11,537,627 | B1 | 12/2022 | Baskaran |
| 11,695,834 | B1 * | 7/2023 | Aggarwal ............ G06Q 10/105 709/217 |
| 11,743,212 | B2 | 8/2023 | Truong |
| 11,770,476 | B2 | 9/2023 | Clodore et al. |
| 11,914,588 | B1 | 2/2024 | Das et al. |
| 11,941,362 | B2 | 3/2024 | Campos Ortega et al. |
| 11,962,546 | B1 | 4/2024 | Hattangady et al. |
| 12,041,098 | B2 | 7/2024 | B M S et al. |
| 12,106,205 | B1 | 10/2024 | Jain et al. |
| 12,210,847 | B2 | 1/2025 | Saito et al. |
| 12,339,886 | B1 | 6/2025 | Jackson |
| 12,367,011 | B2 | 7/2025 | Mann et al. |
| 12,418,555 | B1 | 9/2025 | Skarphedinsson et al. |
| 12,499,318 | B1 | 12/2025 | Setlur et al. |
| 12,511,497 | B1 | 12/2025 | Oks et al. |
| 12,556,559 | B1 | 2/2026 | Bhattacharya et al. |
| 12,566,769 | B1 | 3/2026 | Sun et al. |
| 2003/0142141 | A1 | 7/2003 | Brown et al. |
| 2006/0248045 | A1 | 11/2006 | Toledano et al. |
| 2007/0011281 | A1 | 1/2007 | Jhoney et al. |
| 2009/0031286 | A1 | 1/2009 | Yee et al. |
| 2009/0288004 | A1 | 11/2009 | Strandell et al. |
| 2011/0004565 | A1 * | 1/2011 | Stephenson .......... G06Q 10/067 705/348 |
| 2011/0070901 | A1 | 3/2011 | Alward et al. |
| 2012/0062473 | A1 | 3/2012 | Xiao et al. |
| 2012/0166258 | A1 | 6/2012 | Clemm et al. |
| 2012/0304079 | A1 | 11/2012 | Ridcout et al. |
| 2014/0359439 | A1 | 12/2014 | Lyren |
| 2015/0178876 | A1 | 6/2015 | Kapadia et al. |
| 2016/0035353 | A1 | 2/2016 | Chen et al. |
| 2017/0336940 | A1 | 11/2017 | Townsend et al. |
| 2017/0337287 | A1 | 11/2017 | Gill |
| 2018/0077088 | A1 | 3/2018 | Cabrera-Cordon et al. |
| 2018/0122363 | A1 | 5/2018 | Braz et al. |
| 2018/0131574 | A1 * | 5/2018 | Jacobs ................ H04L 43/0817 |
| 2019/0036850 | A1 | 1/2019 | Kushwaha et al. |
| 2019/0108265 | A1 | 4/2019 | Barmentloo et al. |
| 2019/0108417 | A1 | 4/2019 | Talagala et al. |
| 2019/0155577 | A1 | 5/2019 | Prabha |
| 2019/0171925 | A1 | 6/2019 | Arnold et al. |
| 2019/0258953 | A1 | 8/2019 | Lang et al. |
| 2019/0259377 | A1 | 8/2019 | Mertens et al. |
| 2019/0340524 | A1 | 11/2019 | Kirchhoff et al. |
| 2020/0059483 | A1 * | 2/2020 | Weingarten ......... H04L 63/1441 |
| 2020/0183750 | A1 | 6/2020 | Abdelsalam et al. |
| 2020/0320172 | A1 | 10/2020 | Kalia et al. |
| 2020/0335097 | A1 | 10/2020 | Seol et al. |
| 2021/0012404 | A1 | 1/2021 | Kannan et al. |
| 2021/0042662 | A1 | 2/2021 | Pu et al. |
| 2021/0117893 | A1 | 4/2021 | Sohum et al. |
| 2021/0126984 | A1 | 4/2021 | Parekh et al. |
| 2021/0273973 | A1 * | 9/2021 | Boyer ................. H04L 63/1416 |
| 2021/0288927 | A1 | 9/2021 | Wang |
| 2021/0342785 | A1 | 11/2021 | Mann et al. |
| 2021/0406713 | A1 | 12/2021 | Chauhan et al. |
| 2022/0021652 | A1 * | 1/2022 | Moghe .................... H04L 63/20 |
| 2022/0036153 | A1 | 2/2022 | O'Malia et al. |
| 2022/0044266 | A1 | 2/2022 | Latka et al. |
| 2022/0092116 | A1 | 3/2022 | Gupta et al. |
| 2022/0269957 | A1 | 8/2022 | Rangan |
| 2022/0374340 | A1 * | 11/2022 | Brown ................ G06F 11/3438 |
| 2022/0391729 | A1 | 12/2022 | Duford et al. |
| 2023/0004896 | A1 | 1/2023 | Hartwig et al. |
| 2023/0067222 | A1 | 3/2023 | Filji et al. |
| 2023/0080417 | A1 | 3/2023 | Kwatra et al. |
| 2023/0099604 | A1 | 3/2023 | Coman et al. |
| 2023/0121307 | A1 | 4/2023 | Benchetrit et al. |
| 2023/0186203 | A1 | 6/2023 | Kulkarni et al. |
| 2023/0195885 | A1 | 6/2023 | Khurana et al. |
| 2023/0196015 | A1 | 6/2023 | Coman et al. |
| 2023/0214461 | A1 | 7/2023 | Brooks |
| 2023/0245651 | A1 | 8/2023 | Wang |
| 2023/0252224 | A1 | 8/2023 | Tran |
| 2023/0259705 | A1 | 8/2023 | Tunstall-Pedoe et al. |
| 2023/0297889 | A1 | 9/2023 | Lopez, Jr. |
| 2023/0308460 | A1 | 9/2023 | Thomas et al. |
| 2023/0316138 | A1 | 10/2023 | Nguyen et al. |
| 2023/0342131 | A1 * | 10/2023 | Keezhana ........... G06F 9/45558 |
| 2023/0368284 | A1 | 11/2023 | Sheikh et al. |
| 2023/0412653 | A1 | 12/2023 | Khurana |
| 2024/0015126 | A1 | 1/2024 | Boyd et al. |
| 2024/0070439 | A1 | 2/2024 | Segars et al. |
| 2024/0104094 | A1 | 3/2024 | Li et al. |
| 2024/0187376 | A1 * | 6/2024 | Moghe ................... G06N 20/00 |
| 2024/0193418 | A1 | 6/2024 | Guillame-Bert et al. |
| 2024/0220831 | A1 | 7/2024 | Wyman et al. |
| 2024/0256588 | A1 | 8/2024 | Biscof et al. |
| 2024/0257096 | A1 | 8/2024 | Doumar et al. |
| 2024/0267344 | A1 | 8/2024 | Mulligan et al. |
| 2024/0296316 | A1 | 9/2024 | Simgh et al. |
| 2024/0314587 | A1 * | 9/2024 | Nair ...................... H04W 48/18 |
| 2024/0320251 | A1 | 9/2024 | Hemington et al. |
| 2024/0333666 | A1 | 10/2024 | Desmond et al. |
| 2024/0346568 | A1 * | 10/2024 | Burt ................... G06Q 30/0207 |
| 2024/0354567 | A1 | 10/2024 | Duggal et al. |
| 2024/0362404 | A1 | 10/2024 | Raees et al. |
| 2024/0370479 | A1 | 11/2024 | Hudctz et al. |
| 2024/0370708 | A1 | 11/2024 | Raghavan et al. |
| 2024/0378515 | A1 | 11/2024 | Nakamura et al. |
| 2024/0412720 | A1 | 12/2024 | Vasylyev |
| 2024/0414156 | A1 | 12/2024 | Crabtree et al. |
| 2024/0419983 | A1 | 12/2024 | Verma et al. |
| 2024/0420129 | A1 | 12/2024 | Ramde et al. |
| 2024/0427994 | A1 | 12/2024 | Odland et al. |
| 2025/0004452 | A1 | 1/2025 | Anthony et al. |
| 2025/0005050 | A1 | 1/2025 | Krishnan et al. |
| 2025/0005288 | A1 | 1/2025 | Amatriain-Rubio et al. |
| 2025/0013963 | A1 | 1/2025 | Qazvinian et al. |
| 2025/0016128 | A1 | 1/2025 | Wheeler et al. |
| 2025/0045256 | A1 | 2/2025 | Gottlob et al. |
| 2025/0053142 | A1 | 2/2025 | Oppl |
| 2025/0063140 | A1 | 2/2025 | Grillo et al. |
| 2025/0095642 | A1 | 3/2025 | Ghose et al. |
| 2025/0095808 | A1 | 3/2025 | Davelaar et al. |
| 2025/0110951 | A1 | 4/2025 | Roychowdhury |
| 2025/0118022 | A1 | 4/2025 | Fitzmaurice et al. |
| 2025/0139382 | A1 | 5/2025 | Mohammed et al. |

(56) References Cited

U.S. PATENT DOCUMENTS

| | | | |
|---|---|---|---|
| 2025/0156898 | A1 | 5/2025 | Crabtree et al. |
| 2025/0245258 | A1 | 7/2025 | Buller et al. |
| 2025/0259041 | A1 | 8/2025 | Crabtree et al. |
| 2025/0298816 | A1 | 9/2025 | Hunter |
| 2025/0299675 | A1 | 9/2025 | Lee et al. |
| 2025/0315866 | A1 | 10/2025 | Kelly et al. |
| 2025/0322153 | A1 | 10/2025 | Malviya et al. |
| 2025/0328727 | A1 | 10/2025 | Choladze et al. |
| 2025/0371226 | A1 | 12/2025 | Galvin et al. |
| 2025/0371278 | A1 | 12/2025 | Schyma et al. |
| 2025/0373508 | A1 | 12/2025 | Kulikowski et al. |
| 2025/0384216 | A1 | 12/2025 | Nallam |
| 2026/0003874 | A1 | 1/2026 | Jootoo Ramesh Bapu et al. |
| 2026/0024037 | A1 | 1/2026 | Mystetskyi et al. |
| 2026/0031155 | A1 | 1/2026 | Mystetskyi et al. |
| 2026/0032155 | A1 | 1/2026 | Mystetskyi et al. |
| 2026/0057422 | A1 | 2/2026 | Martis et al. |
| 2026/0058997 | A1 | 2/2026 | Qureshi |
| 2026/0067119 | A1 | 3/2026 | Shernan et al. |
| 2026/0080013 | A1 | 3/2026 | Pillai et al. |
| 2026/0087447 | A1 | 3/2026 | Makhija et al. |
| 2026/0093544 | A1 | 4/2026 | Mystetskyi et al. |
| 2026/0094029 | A1 | 4/2026 | Mystetskyi et al. |
| 2026/0106846 | A1 | 4/2026 | Agarwal et al. |
| 2026/0127199 | A1 | 5/2026 | Mystetskyi et al. |
| 2026/0134038 | A1 | 5/2026 | Mystetskyi et al. |
| 2026/0140791 | A1 | 5/2026 | Chilakamarri et al. |
| 2026/0154115 | A1 | 6/2026 | Mystetskyi et al. |
| 2026/0163752 | A1 | 6/2026 | Mishra et al. |
| 2026/0181056 | A1 | 6/2026 | Mystetskyi et al. |

FOREIGN PATENT DOCUMENTS

| | | |
|---|---|---|
| WO | WO 2025/037311 | 2/2025 |
| WO | WO 2025/037312 | 2/2025 |
| WO | WO 2025/037313 | 2/2025 |
| WO | WO 2025/058832 | 3/2025 |

OTHER PUBLICATIONS

International Search Report and the Written Opinion Dated Dec. 19, 2024 From the International Searching Authority Re. Application No. PCT/IL2024/050821. (16 Pages).

International Search Report and the Written Opinion Dated Dec. 30, 2024 From the International Searching Authority Re. Application No. PCT/IL2024/050822 (9 Pages).

Invitation to Pay Additional Fees Dated Oct. 7, 2024 From the International Searching Authority Re. Application No. PCT/IL2024/050820. (3 Pages).

Invitation to Pay Additional Fees Dated Oct. 7, 2024 From the International Searching Authority Re. Application No. PCT/IL2024/050821. (2 Pages).

Invitation to Pay Additional Fees Dated Oct. 17, 2024 From the International Searching Authority Re. Application No. PCT/IL2024/050822. (3 Pages).

Notice of Allowance Dated Sep. 22, 2025 from U.S. Appl. No. 19/179,061. (10 pages).

Notice of Allowance Dated Jun. 30, 2025 from U.S. Appl. No. 19/179,092. (9 pages).

Official Action Dated Dec. 15, 2025 from U.S. Appl. No. 19/344,252. (46 pages).

Official Action Dated May 19, 2025 from U.S. Appl. No. 19/179,061. (28 pages).

Restriction Official Action Dated Dec. 11, 2025 From U.S. Appl. No. 19/344,291. (9 pages).

De C. Gatti et al. "An Agent-Based Architecture for Knowledge Management in Context-Aware Business Processes", Proceedings of the 2010 14th International Conference on Computer Supported Cooperative Work in Design, p. 318-323, 2010.

International Preliminary Report on Patentability Dated Feb. 26, 2026 From the International Bureau of WIPO Re. Application No. PCT/IL2024/050820 (10 Pages).

International Preliminary Report on Patentability Dated Feb. 26, 2026 From the International Bureau of WIPO Re. Application No. PCT/IL2024/050821 (13 Pages).

International Preliminary Report on Patentability Dated Feb. 26, 2026 From the International Bureau of WIPO Re. Application No. PCT/IL2024/050822 (8 Pages).

Official Action Dated Mar. 3, 2026 from U.S. Appl. No. 19/344,291. (23 Pages).

Official Action Dated Mar. 9, 2026 from U.S. Appl. No. 19/437,414. (31 pages).

Official Action Dated Mar. 10, 2026 from U.S. Appl. No. 19/344,329. (26 pages).

Google "Web Search History", Google, 1 P., Feb. 12, 2026.

Interview Summary Dated May 14, 2026 from the U.S. Appl. No. 19/437,414. (2 pages).

Interview Summary Dated Apr. 17, 2026 from the U.S. Appl. No. 19/344,291. (2 pages).

Notice of Allowance Dated Apr. 22, 2026 from the U.S. Appl. No. 19/344,252. (12 pages).

Official Action Dated Apr. 1, 2026 from the U.S. Appl. No. 19/437,406. (20 pages).

Official Action Dated May 4, 2026 from the U.S. Appl. No. 19/450,906. (21 pages).

Official Action Dated May 4, 2026 from the U.S. Appl. No. 19/450,923. (16 pages).

Official Action Dated May 7, 2026 from the U.S. Appl. No. 19/344,305. (35 Pages).

Official Action Dated Apr. 13, 2026 from the U.S. Appl. No. 19/450,863. (21 pages).

Official Action Dated Mar. 17, 2026 from the U.S. Appl. No. 19/344,215. (59 pages).

Official Action Dated Mar. 26, 2026 from the U.S. Appl. No. 19/392,271. (28 pages).

Official Action Dated May 29, 2026 from the U.S. Appl. No. 19/450,907. (30 pages).

International Search Report and the Written Opinion Dated Jun. 8, 2026 From the International Searching Authority Re. Application No. PCT/IL2026/050061 (26 Pages).

Interview Summary Dated Jul. 2, 2026 from the U.S. Appl. No. 19/450,906. (4 pages).

Notice of Allowance Dated Jun. 30, 2026 from the U.S. Appl. No. 19/437,414. (26 pages).

Official Action Dated Jul. 7, 2026 from the U.S. Appl. No. 19/344,329. (42 pages).

Official Action Dated Jul. 7, 2026 from the U.S. Appl. No. 19/655,816. (17 pages).

Official Action Dated Jun. 12, 2026 from the U.S. Appl. No. 19/450,833. (40 pages).

Official Action Dated Jul. 14, 2026 from the U.S. Appl. No. 19/655,825. (37 pages).

Official Action Dated Jun. 25, 2026 from the U.S. Appl. No. 19/344,291. (33 pages).

* cited by examiner

INTENT-BASED INTERACTIONS IN SOFTWARE PLATFORMS

RELATED APPLICATIONS

This application is a Continuation of U.S. patent application Ser. No. 19/357,153 filed on Oct. 14, 2025, which is a Continuation of U.S. patent application Ser. No. 19/179,092 filed on Apr. 15, 2025, now U.S. Pat. No. 12,450,312, which is a Continuation of PCT Patent Application No. PCT/IL2024/050822 having International Filing Date of Aug. 14, 2024, which claims the benefit of priority under 35 USC § 119 (e) of U.S. Provisional Patent Application Nos. 63/519,519 filed on Aug. 14, 2023; 63/548,339 filed on Nov. 13, 2023 and 63/645,998 filed on May 13, 2024. The contents of the above applications are all incorporated by reference as if fully set forth herein in their entirety.

FIELD AND BACKGROUND OF THE INVENTION

The present invention relates generally to the field of cloud-based software solutions and artificial intelligence. More specifically, the invention pertains to methods and systems for integrating generative artificial intelligence capabilities within Software as a Service (Saas) platforms to enhance data interaction, analysis, and product customization.

In recent years, Software as a Service (SaaS) has emerged as a dominant model for delivering software applications over the internet. SaaS platforms offer numerous advantages, including accessibility, scalability, and cost-effectiveness. These platforms have become integral to various business operations, from customer relationship management to project planning and data analysis.

Concurrently, the field of artificial intelligence, particularly generative AI, has seen rapid advancements, generative AI models, capable of creating new content and providing intelligent responses based on vast amounts of training data, have shown immense potential in enhancing user interactions and automating complex tasks.

SUMMARY OF THE INVENTION

According to an aspect of some embodiments of the present invention provides systems and methods for integrating generative artificial intelligence (AI) capabilities within Software as a Service (SaaS) platforms. In various embodiments, the invention enables enhanced data interaction, analysis, and product customization in cloud-based software environments.

According to some embodiments of the present invention, there is provided a computer-implemented method for querying a generative AI model about structured data in a SaaS platform. The method comprises displaying a table structure of data on a display device, displaying a selectable element allowing a user to change a status of a graphical cursor to an AI supported state, identifying an area, for example a plurality of pixels, marked using the graphical cursor in the AI supported state as defining a target attribute, querying a generative AI model with the target attribute, and presenting descriptive information acquired from the generative AI model to the user.

In another aspect, some embodiments of the present invention provide a system and a method for querying a generative AI model about information presented by a SaaS platform. The system maintains an AI agent configured to interact with SaaS platform data as a virtual team member. The system identifies portions of displayed data marked by a user, queries the generative AI model to identify platform elements and determine actions to perform, and instructs the AI agent to notify the user of performable actions.

A further aspect of some embodiments of the present invention provides a system and a method for color-context aware data analysis in structured data. The method maintains a table structure and a generative AI model, receives user queries and color associations for portions of the table structure, and queries the generative AI model to acquire contextual outputs that differ based on color associations.

Some embodiments of the present invention provide a system and a method for generating interactive elements in a messaging session with an AI agent. The method displays tabular data, identifies queries about the data, prompts a generative AI model to generate responses, and creates interactive elements in the messaging interface that share graphical characteristics with the tabular data.

Another aspect relates to some embodiments of the present invention provides a system and a method for cross-application AI agent interaction in a SaaS platform. The method identifies user mentions of an AI agent in one platform element, determines instructions spanning multiple platform elements, and executes actions across different elements or applications based on a single user interaction.

The invention further provides systems and methods for using generative AI to create custom SaaS platform products by combining functionalities from existing products based on user requirements. This enables rapid development of tailored solutions without extensive manual development.

These and other aspects of the invention provide significant advancements in integrating AI capabilities within SaaS platforms, enhancing data analysis, customization, and cross-application functionality in cloud-based software environments.

In some embodiments of the present invention, a computer-implemented method for querying a generative AI model about structured data is provided, comprising: displaying at least one table structure of data on a display device; displaying a selectable element allowing a user to change a status of a graphical cursor presented on a display for instance to show the user a position in a graphical user interface from a general state to an AI supported state; when the status of the graphical cursor is the AI supported state, identifying an area, for example a plurality of pixels, marked using the graphical cursor on the display device in a region of the at least one table structure as a marked area, the marked area defines at least one target attribute for the region; querying the generative AI model with the target attribute to acquire descriptive information about the target attribute; and presenting descriptive information to the user. The curser may also be understood as a user selection indicator, for instance in response to a user touching a touch screen.

Optionally, the selectable element is a graphical button or a virtual toggle switch displayed in a graphical user interface.

Optionally, the status of the state of the graphical cursor to the AI-assisted state replaces standard mouse functionality with AI-dedicated functionality.

Optionally, the AI-dedicated functionality triggers a presentation of an input user interface adapted to receive from the user query specific portions of the target attribute.

Optionally, when the graphical cursor is in the AI-assisted state: a) a mouse-click operation triggers an AI query based on visual and contextual information from the marked area; b) a different mouse-click operation generates automatic suggestions for the clicked portion of the display.

Optionally, the method further comprises: a) determining a context of the target attribute within the data presentation; b) including the determined context in the query to the generative AI model.

Optionally, the descriptive information includes recommendations based on the determined context of the target attribute.

Optionally, the at least one table structure includes project management data, and the target attribute corresponds to a project element.

Optionally, the method further comprises: a) storing a history of queries and corresponding descriptive information; b) using the stored history to improve subsequent queries to the generative AI model.

In some embodiments of the present invention, a computer-implemented method for querying a generative AI model about information presented by a Software as a Service (SaaS) platform is provided, comprising: maintaining an artificial intelligence (AI) agent configured to interact with SaaS platform data of a project as a member of a team assigned to the project; displaying on a screen SaaS platform data comprising at least one table structure with a plurality of interactive cells; identifying a portion of the screen marked by the user using a graphical user interface (GUI) controlling device; querying the generative AI model with the identified portion of the screen to: i) identify one or more platform elements included in the identified portion; ii) determine relationships between the identified platform elements; iii) determine at least one action to perform on the identified platform elements based on the determined at least one action; instructing the generative AI agent to notify the user of performable actions that suit the determined relationships and the identified platform elements.

Optionally, identifying the portion of the screen further comprises: a) determining a number of UI elements selected within the marked area; b) associating the selected UI elements into one or more subgroups based on their characteristics.

Optionally, associating the selected UI elements into subgroups comprises: identifying similar UI elements, such as headlines or columns, and grouping them together regardless of the total number of individual elements selected.

Optionally, the method further comprises: analyzing a context within which the identified portion is found in the table structure and performing the querying accordingly.

Optionally, the at least one action to perform includes providing context-based recommendations.

Optionally, the method further comprises: updating the table structure to reflect changes made by the generative AI agent after performing the at least one action.

Optionally, identifying the platform elements is based on both the marked portion and the context of the surrounding data in the table structure.

Optionally, the method further comprises: presenting a preview of the at least one action to the user before instructing the generative AI agent to perform the action.

Optionally, the generative AI model is trained on historical project data to improve its ability to identify relevant platform elements and actions.

Optionally, a) when the identified portion includes two columns, the generative AI agent provides automation that includes both columns; b) when the identified portion includes an icon for an action, the generative AI agent checks whether this action is relevant or recommended for the displayed table; c) when the identified portion includes a plurality of unconnected platform elements, a notification for clarification of intent is sent to the user; d) when the identified portion includes a majority of connected platform elements, the generative AI agent determines that output will be provided for those elements.

Optionally, the SaaS platform data is stored as a plurality of items representing the data in tables.

In some embodiments of the present invention, a computer-implemented method for querying a generative artificial intelligence (AI) model about color context in structured data is provided, comprising: maintaining and displaying a at least one table structure; maintaining a generative AI model adapted to be prompted with at least a portion of the at least one table structure; receiving a first user query for a selected portion of the at least one table structure; querying the generative AI model with the selected portion to acquire a first contextual output; receiving a user input associating at least one component of the selected portion with a color; querying the generative AI model with the color-associated selected portion to acquire a second contextual output; wherein the difference between the first and second outputs is associated with the color associated with the at least one component of the at least one table structure.

Optionally, the method further comprises: identifying an area, such as a plurality of pixels, marked by the user in a region of the at least one table structure, defining color attributes for the region; querying the generative AI model with the selected portion and the color attributes to acquire additional contextual information; calculating instructions to color another region of the at least one table structure based on the acquired contextual information; executing the calculated instructions.

Optionally, the generative AI model is configured to interpret the same alphanumeric value differently based on its associated color properties within the at least one table structure.

Optionally, the color association provides additional context for the generative AI model's interpretation, such as red indicating urgency or green indicating approval.

Optionally, the method further comprises: analyzing relationships between color-associated components and non-color-associated components within the selected portion to derive additional context.

Optionally, the generative AI model is trained to recognize common color-coding conventions used in various industries or project management methodologies.

Optionally, the method further comprises: generating recommendations for color usage based on the generative AI model's interpretation of existing color context within the at least one table structure.

Optionally, the at least one table structure is part of a Software as a Service (SaaS) platform interface.

Optionally, the method further comprises: maintaining a history of color-context interpretations to improve the generative AI model's future analysis of similar color-coded data.

Optionally, the generative AI agent can suggest color coding for unmarked portions of the at least one table structure based on its interpretation of existing color-coded sections.

In some embodiments of the present invention, a computer-implemented method for generating interactive elements in a messaging session is provided, comprising: displaying data in a tabular structure comprising a plurality of interactive cells, each having graphical characteristics; b) maintaining a messaging session with a generative AI agent in a messaging GUI element; identifying a query about the tabular structure in the messaging session; prompting a generative artificial intelligence (AI) model with the query to acquire a response pointing to a subgroup of the plurality of interactive cells; generating an interactive element within the messaging GUI element that is adapted to enable a user to change at least one value of at least one of the plurality of interactive cells of at least one member of the subgroup; wherein the interactive element and the corresponding at least one member of the subgroup share common graphical characteristics; adding the interactive element as at least part of a message response in the messaging session.

Optionally, the common graphical characteristics include color, font, size, or style of the interactive cells.

Optionally, the method further comprises: updating the tabular structure in real-time when the user changes a value using the interactive element in the messaging session.

Optionally, the generative AI model is trained to recognize and replicate the graphical characteristics of the tabular structure in its generated interactive elements.

Optionally, the method further comprises: providing context-aware suggestions or validations when the user interacts with the generated interactive element.

Optionally, the messaging GUI element is part of a Software as a Service (SaaS) platform interface.

Optionally, the method further comprises: maintaining a history of interactions with the generated interactive elements to improve the generative AI model's future responses and suggestions.

Optionally, the generative AI agent can generate multiple interactive elements for different subgroups of the tabular structure within a single message response.

Optionally, the method further comprises: allowing the user to expand or collapse the interactive element to view or hide additional details or related data from the tabular structure.

Optionally, the generative AI model interprets color-based context in the tabular structure and reflects this interpretation in the generated interactive elements.

In some embodiments of the present invention, a computer-implemented method for operating a software as a service (SaaS) platform is provided, comprising: maintaining a messaging session with a generative AI agent; identifying a section of text message issued by a user that textually refers to an alphanumeric identifier of the generative AI agent in a first platform element; using text and platform elements in the first platform element to identify one or more user instructions in the messaging session; identifying references to one or more platform elements other than the first platform element that are associated with the instructions; prompting a generative artificial intelligence (AI) model associated with the generative AI agent to generate SaaS platform instructions for changing one or more values in the one or more platform elements in accordance with the user instructions; executing the SaaS platform instructions for changing the one or more values; and notifying the user of the execution.

Optionally, the first platform element and the other platform elements are different applications within the SaaS platform.

Optionally, the first platform element and the other platform elements are different platform elements within the same application of the SaaS platform.

Optionally, notifying the user comprises sending a notification in either the first platform element or one of the other platform elements.

Optionally, the method further comprises: providing a visualization of the other platform elements to the user following the execution of the SaaS platform instructions.

Optionally, the alphanumeric identifier of the generative AI agent is a mention symbol followed by the generative AI agent's name.

Optionally, the method further comprises: providing the generative AI agent with credentials to access the messaging session upon identification of the alphanumeric identifier, where the generative AI agent did not have access to the messaging session before.

Optionally, notifying the user comprises adding a message in the messaging session indicative of the performance of changing the one or more values.

Optionally, the generative AI model is trained to interpret context across different platform elements or applications within the SaaS environment.

Optionally, the method further comprises: maintaining a history of cross-platform actions triggered by generative AI agent mentions to improve the generative AI model's future interpretations and actions.

Optionally, the generative AI agent is capable of performing actions across multiple platform elements or applications based on a single mention and instruction set in the messaging session.

In some embodiments of the present invention, a system for using generative artificial intelligence for intent-based interaction with a SaaS platform is provided, comprising: one or more processors configured to: maintain a plurality of task tables, wherein each task table contains a plurality of items, each item being defined by a row of cells, at least two of the cells associated with a workflow step; maintain a generative artificial intelligence (AI) model trained based on analysis of interactions with alphanumeric data stored in the plurality of task tables; receive user selection indicative of a desired platform element to be added to the SaaS platform; use the generative AI model to calculate instructions for adding the platform element; identify at least one workflow step that can be implemented by two or more platform elements; use the generative AI model to calculate which of the two or more platform elements would be most suitable for the workflow in the SaaS platform context; perform the instructions to implement the platform element.

Optionally, the one or more processors are further configured to: a) receive a natural language request to build a platform element; b) analyze the request using the generative AI model to deduce the main requirement of the platform element in the context of the request.

Optionally, the one or more processors are further configured to: use the generative AI model to deduce required functionalities and data to be displayed to satisfy the main requirement.

Optionally, the one or more processors are further configured to: determine, using the generative AI model, which platform elements are most suitable to satisfy the deduced requirements and functionalities.

Optionally, the one or more processors are further configured to: automatically build the platform element by combining the determined suitable platform elements based on the deduced requirements and functionalities.

Optionally, the platform element comprises at least one of a board, a dashboard, or a workflow.

Optionally, the generative AI model is further trained on user feedback and usage patterns of previously created platform elements.

Optionally, the instructions for adding the platform element include arranging visual components, configuring data sources, and setting up interactive features.

Optionally, the one or more processors are further configured to: a) present a preview of the platform element to the user before performing the instructions; b) receive user feedback on the preview; c) adjust the instructions based on the user feedback.

Optionally, the one or more processors are further configured to: continuously update the generative AI model based on user interactions with the created platform elements to improve future recommendations and builds.

Optionally, the one or more processors are further configured to: analyze the context of the SaaS platform, including existing platform elements and user roles, to optimize the generated platform element for seamless integration.

Optionally, the generative AI model is capable of suggesting improvements or modifications to existing platform elements based on usage patterns and performance metrics.

In some embodiments of the present invention, a system for using generative artificial intelligence for creating SaaS platform products is provided, comprising: one or more processors configured to: maintain a plurality of products of a SaaS platform, each of the plurality of products having a plurality of shared functionalities and one or more product-specific functionalities; receive an input comprising specification of user requirements for a new SaaS platform product; prompt a generative model, trained with data documenting the plurality of the products, with the specification to identify required product-specific functionalities to be included together with the shared functionalities in the new SaaS platform product from two or more of the plurality of the products; calculate instructions to assign the required functionalities to the new SaaS platform product, wherein the required functionalities are originated from at least two different products from the plurality of products; and execute the instructions.

Optionally, the one or more processors are further configured to: identify two or more overlapping functionalities from the required functionalities; and determine, using the generative model, which of the overlapping functionalities should be included in the new SaaS platform product.

Optionally, the one or more processors are further configured to: analyze the specification of the new product to identify key functionalities required.

Optionally, the generative model is trained to recognize unique functionalities across different products within the SaaS platform.

Optionally, the required functionalities are selected to fulfill together the requirements of the new product.

Optionally, the one or more processors are further configured to: customize the required functionalities to fit the specific needs of the new product before assigning them to the new product.

Optionally, the one or more processors are further configured to: calculate a licensing cost for the new product based on the number and type of product specific functionalities included for the new SaaS platform product.

Optionally, the one or more processors are further configured to: generate a user interface for the new product that integrates the functionalities of the required functionalities seamlessly.

Optionally, the instructions to assign the required functionalities include steps to adapt the data structures of the required functionalities to work cohesively in the new product environment.

Optionally, the one or more processors are further configured to: provide recommendations for additional complementary functionalities that could enhance the functionality of the new product.

Optionally, the generative model is periodically updated with data from newly created products to improve its selection capabilities.

Optionally, the one or more processors are further configured to: generate documentation for the new product, explaining how the functionalities from different required functionalities have been combined and how to use them effectively.

Optionally, the one or more processors are further configured to: perform compatibility checks between selected functionalities and suggest alternatives or modifications when conflicts are detected.

Optionally, the new SaaS platform product is dynamically adjustable, allowing users to add or remove functionalities post-creation based on evolving needs.

In some embodiments of the present invention, a system for using generative artificial intelligence for creating SaaS platform products is provided, comprising: one or more processors configured to: maintain a plurality of products of a SaaS platform, each of the plurality of products having a plurality of product-specific functionalities; receive a specification of user requirements for a new SaaS platform product; prompt a generative model trained with data documenting the plurality of products with the specification to identify required functionalities to be included in the new SaaS platform product from two or more of the plurality of products; calculate instructions to assign the required functionalities to the new SaaS platform product, wherein the required functionalities are originated from at least two different products from the plurality of products; and execute the instructions.

Optionally, one or more of the required functionalities are created for the respective product by one or more users assigned to the respective product.

Optionally, the one or more processors are further configured to: analyze the specification of the new product to identify key functionalities required.

Optionally, the generative model is trained to recognize unique functionalities across different products within the project management platform.

Optionally, the required functionalities are selected to fulfill together the requirements of the new product.

Optionally, the one or more processors are further configured to: customize the required functionalities to fit the specific needs of the new product before assigning them to the new product.

Optionally, the one or more processors are further configured to: calculate a licensing cost for the new product based on the number and type of functionalities included from the required functionalities.

Optionally, the one or more processors are further configured to: generate a user interface for the new product that integrates the functionalities of the required functionalities seamlessly.

Optionally, the instructions to assign the required functionalities include steps to adapt the data structures of the required functionalities to work cohesively in the new product environment.

Optionally, the one or more processors are further configured to: provide recommendations for additional complementary functionalities that could enhance the functionality of the new product.

Optionally, the generative model is periodically updated with data from newly created products to improve its selection capabilities.

Optionally, the one or more processors are further configured to: generate documentation for the new product, explaining how the functionalities from different required functionalities have been combined and how to use them effectively.

Optionally, the new SaaS platform product is built on a WorkOS base, and the one or more processors are further configured to: select the most fitting components for each element of the product's data structure based on the user requirements and compatibility with the selected functionalities.

Optionally, the one or more processors are further configured to: create specialized features for specific industries by combining functionalities from different products, such as combining work management functionalities with email tracking functionalities to create a docketing feature for law firms.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
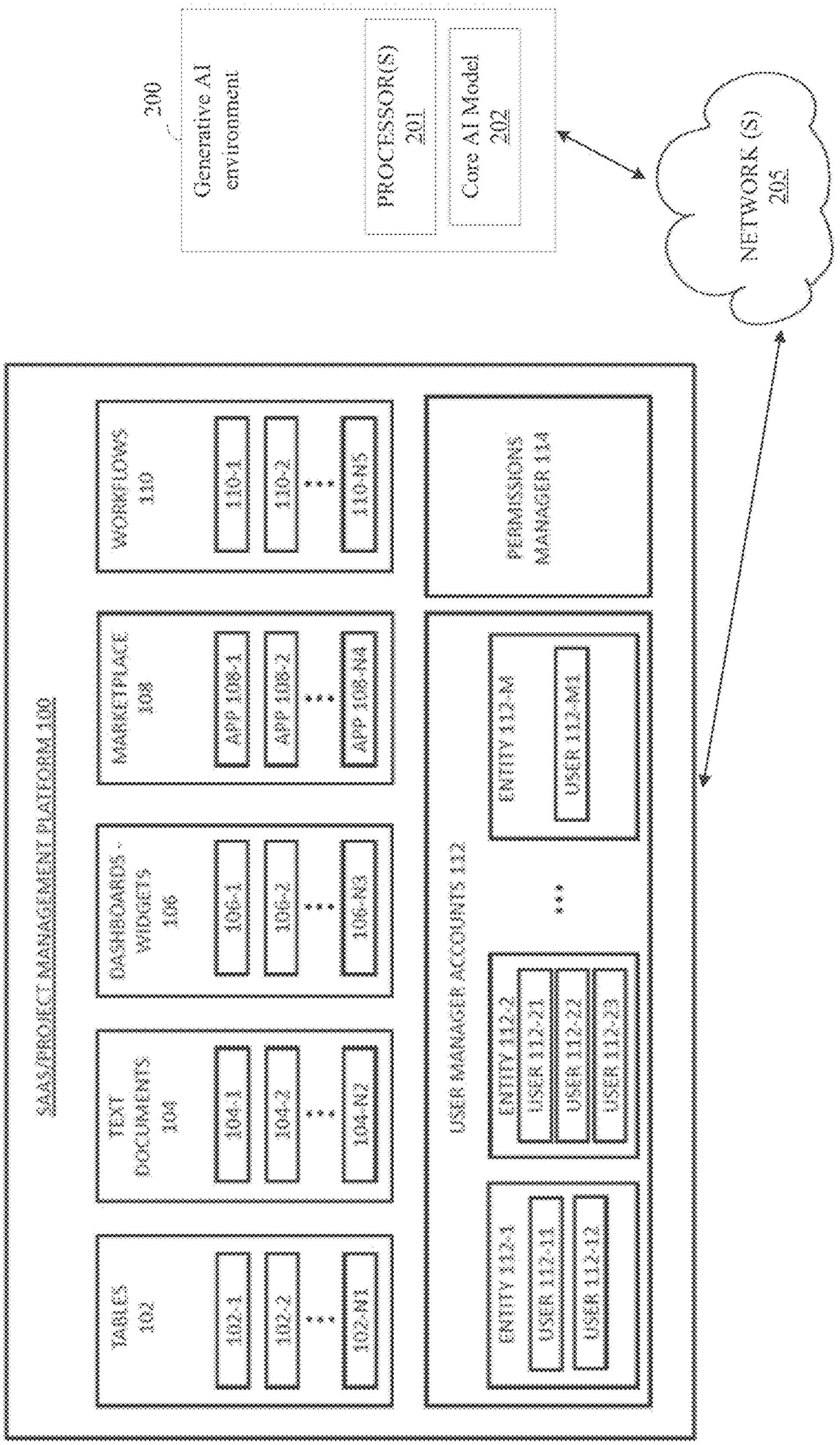
FIG. 1A is a block diagram of an exemplary SaaS platform and generative AI environment, according to some embodiments of the present invention.

The present invention, in some embodiments thereof, relates to methods for implementing artificial intelligence capabilities in software applications and, more particularly, but not exclusively, to systems and methods for integrating generative artificial intelligence within SaaS platforms.

Despite these parallel advancements as described in the background section above, the integration of sophisticated AI capabilities within SaaS platforms has remained limited. Traditional SaaS solutions often struggle with several challenges.

First, users frequently find it difficult to efficiently explore and analyze large datasets within SaaS platforms. The ability to intuitively query and manipulate data remains constrained by traditional user interface paradigms. Second, existing systems often lack the ability to understand and utilize the context in which data exists, leading to less insightful analysis and recommendations. Third, many SaaS platforms operate in silos, with limited ability to perform actions across different applications or modules seamlessly. Fourth, creating custom solutions or scaling existing ones to meet specific business needs often requires extensive development efforts, increasing costs and time-to-market. Fifth, while some level of automation exists in current SaaS platforms, truly intelligent automation that can understand user intent and adapt to evolving requirements remains elusive. Also, the ability to present data in intuitive, interactive formats that aid in quick understanding and decision-making is often limited and efficient allocation and management of AI resources within SaaS environments to balance performance and cost considerations is an ongoing challenge.

These limitations have created a significant gap in the market for more intelligent, adaptive, and user-centric SaaS solutions. There is a clear need to address these challenges and unlock new possibilities in cloud-based software delivery.

Embodiments of the present invention aims to bridge this gap by introducing a suite of methods and systems that deeply integrate generative AI capabilities within SaaS platforms. By doing so, it seeks to transform how users interact with data, how applications communicate within the SaaS ecosystem, and how custom solutions are created and deployed.

Embodiments of the present invention, represent a significant step forward in the evolution of SaaS platforms, promising to enhance productivity, decision-making, and overall user experience in cloud-based software environments. The following detailed description will elucidate the novel approaches and technologies employed to achieve these objectives.

Embodiments of the present invention relates to advanced methods and systems for integrating generative artificial intelligence (AI) capabilities within Software as a Service (SaaS) platforms. This suite of innovations addresses key challenges in data interaction, analysis, and product customization within cloud-based software environments.

According to some embodiments of the present invention there are described methods and system for AI-Assisted data interaction (e.g., FIG. 2A-2E). These embodiments introduce an AI-supported cursor state that allows users to interact with structured data in novel ways. By toggling into an AI-supported state, users can mark areas of interest and query a generative AI model about the data. This method significantly enhances data exploration and analysis capabilities within SaaS platforms.

Figure 3:
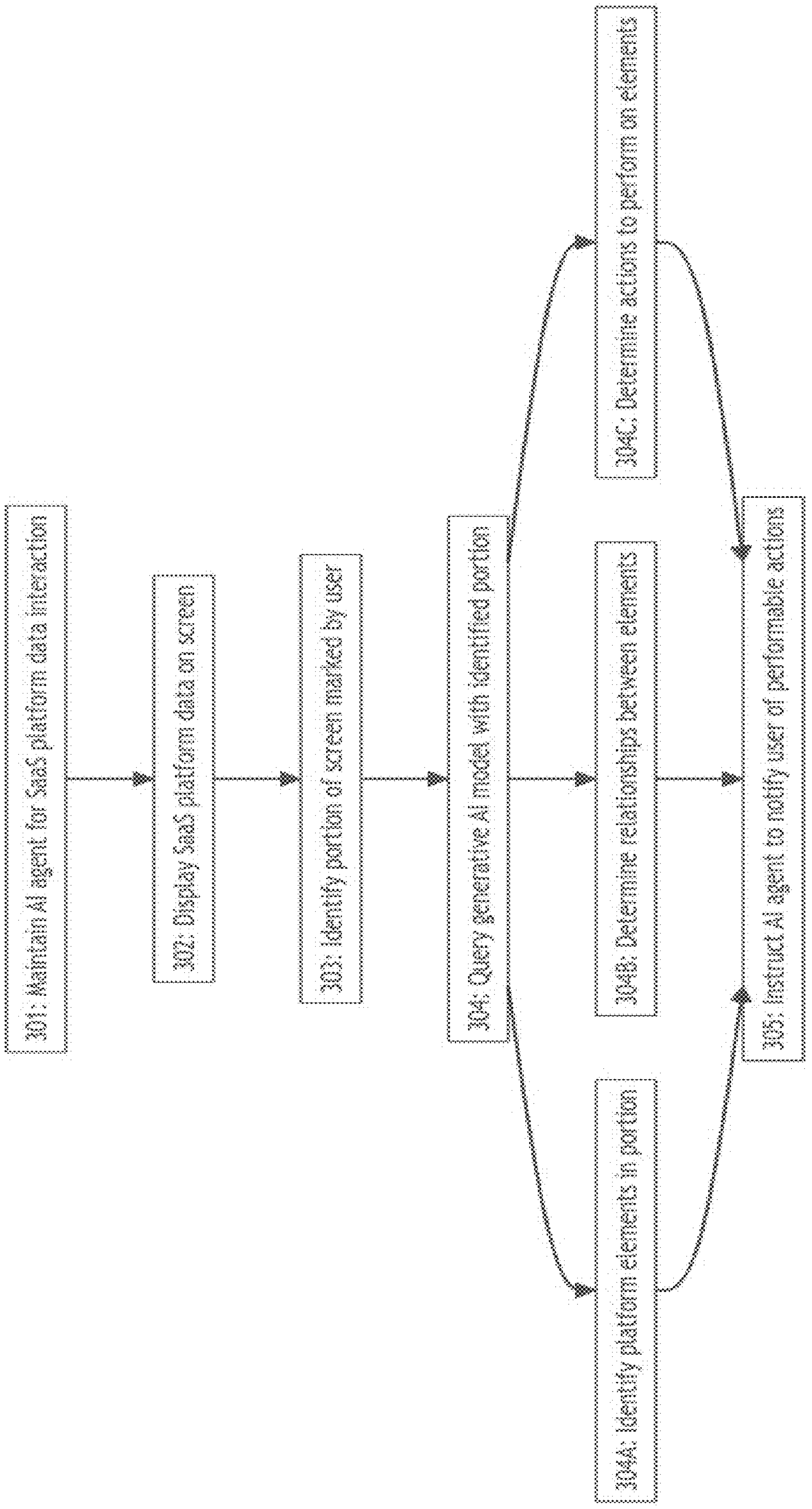
FIG. 3 is a flowchart illustrating a process for querying a generative AI model about information presented by a SaaS platform, according to some embodiments of the present invention.

According to some embodiments of the present invention there are described methods and system for context-aware AI Querying (e.g., FIG. 3). Building on the AI-assisted interaction, this invention enables the generative AI model to understand and utilize the context of selected data elements. It allows for more nuanced and relevant AI responses, taking into account relationships between different data elements and their surrounding context within the SaaS platform.

Figure 4:
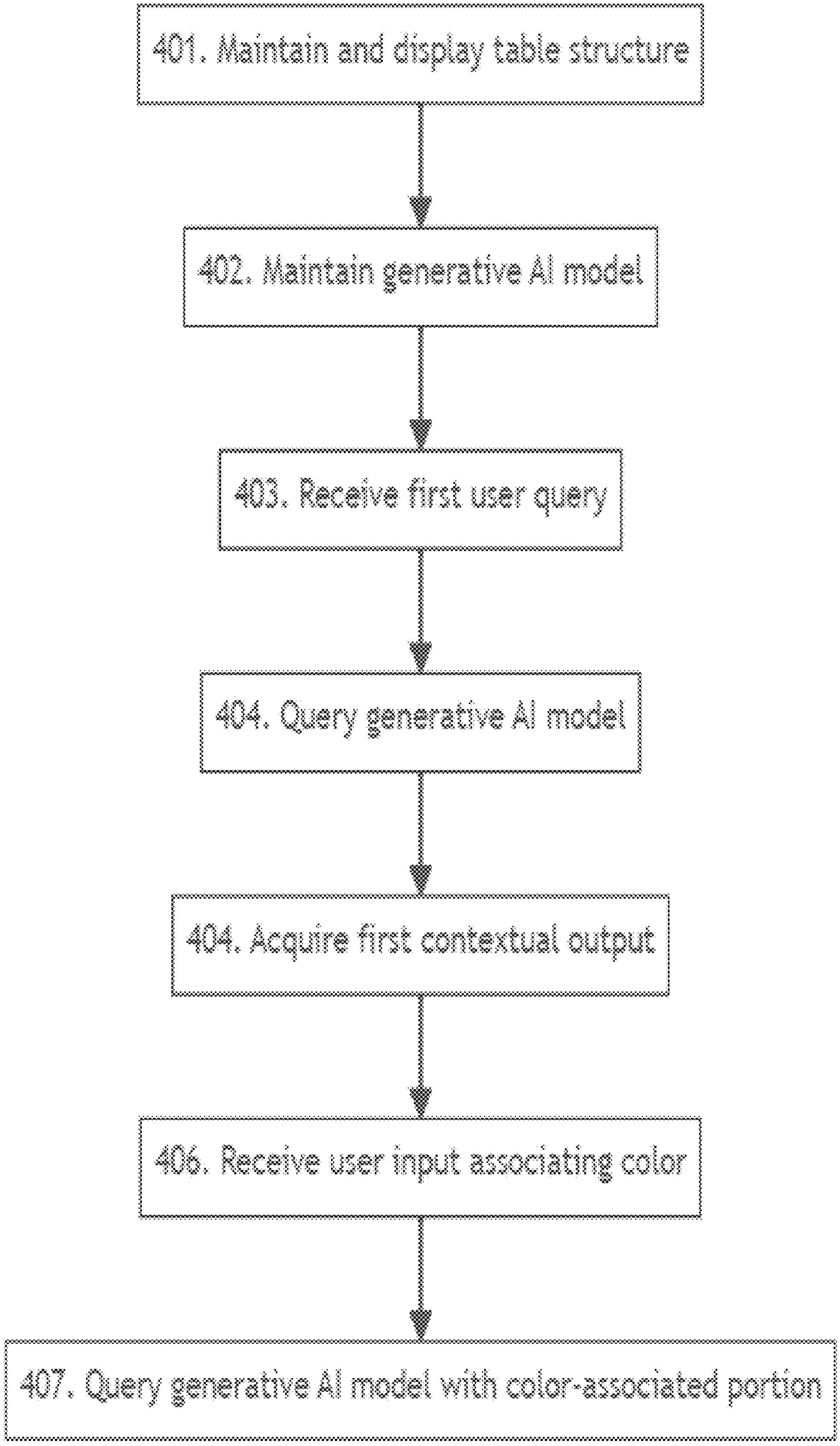
FIG. 4 is a flowchart illustrating a process for querying a generative AI model about color context in structured data, according to some embodiments of the present invention.

According to some embodiments of the present invention there are described methods and system for color-context aware data analysis (e.g., FIG. 4). These embodiments allow the generative AI model to interpret and utilize color-based context in structured data. By understanding the semantic meaning of colors in data presentation, the system can provide more insightful analysis and recommendations, enhancing data visualization and interpretation.

Figure 5:
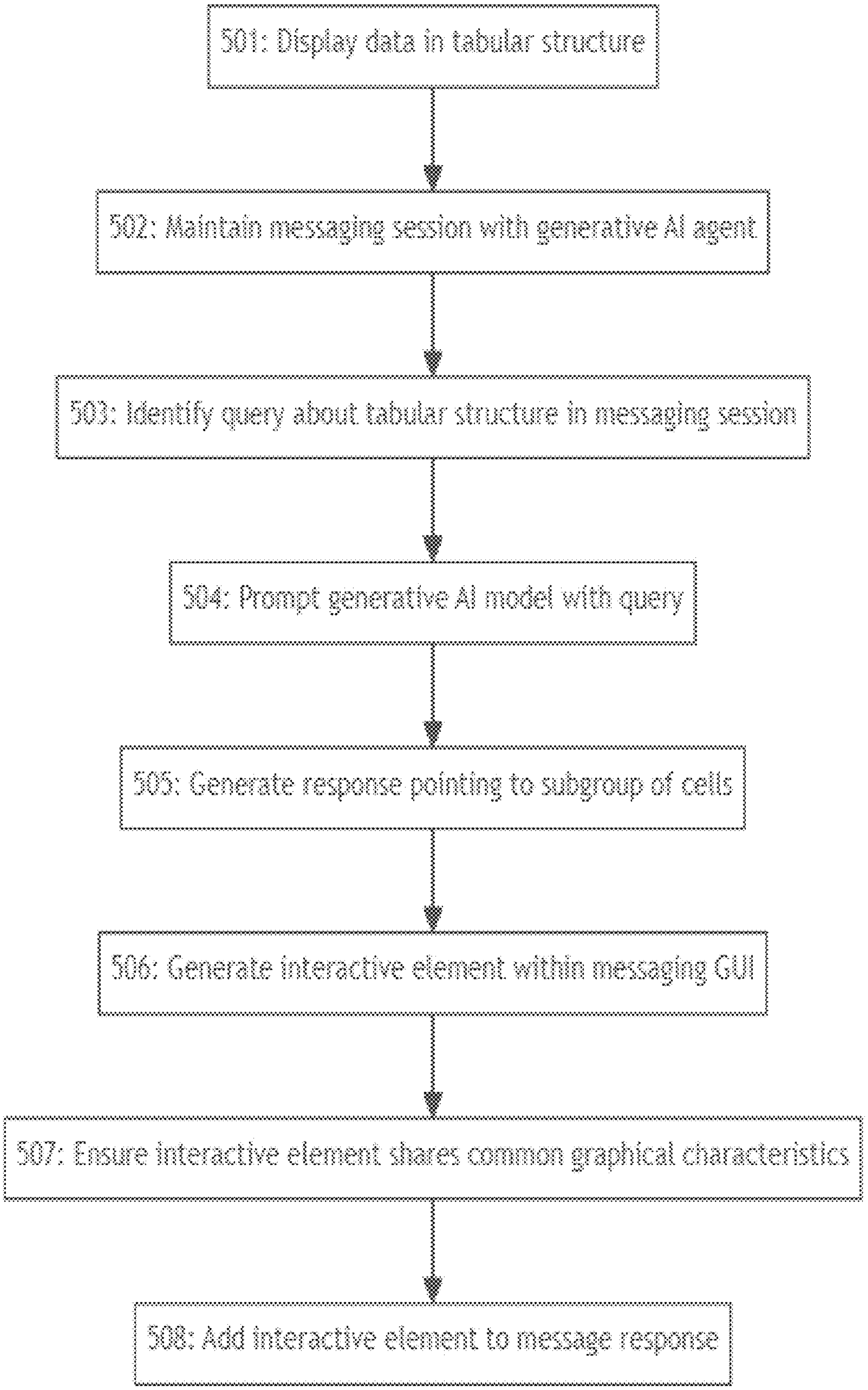
FIG. 5 is a flowchart illustrating a process for generating interactive elements in a messaging session, according to some embodiments of the present invention.

According to some embodiments of the present invention there are described methods and system for interactive ai-generated elements in messaging (e.g., FIG. 5). These embodiments teach focus on generating interactive elements within messaging sessions that mirror the visual characteristics of source data. It bridges the gap between conversational interfaces and data manipulation, allowing users to interact with and modify data directly within chat-like interfaces.

Figure 6:
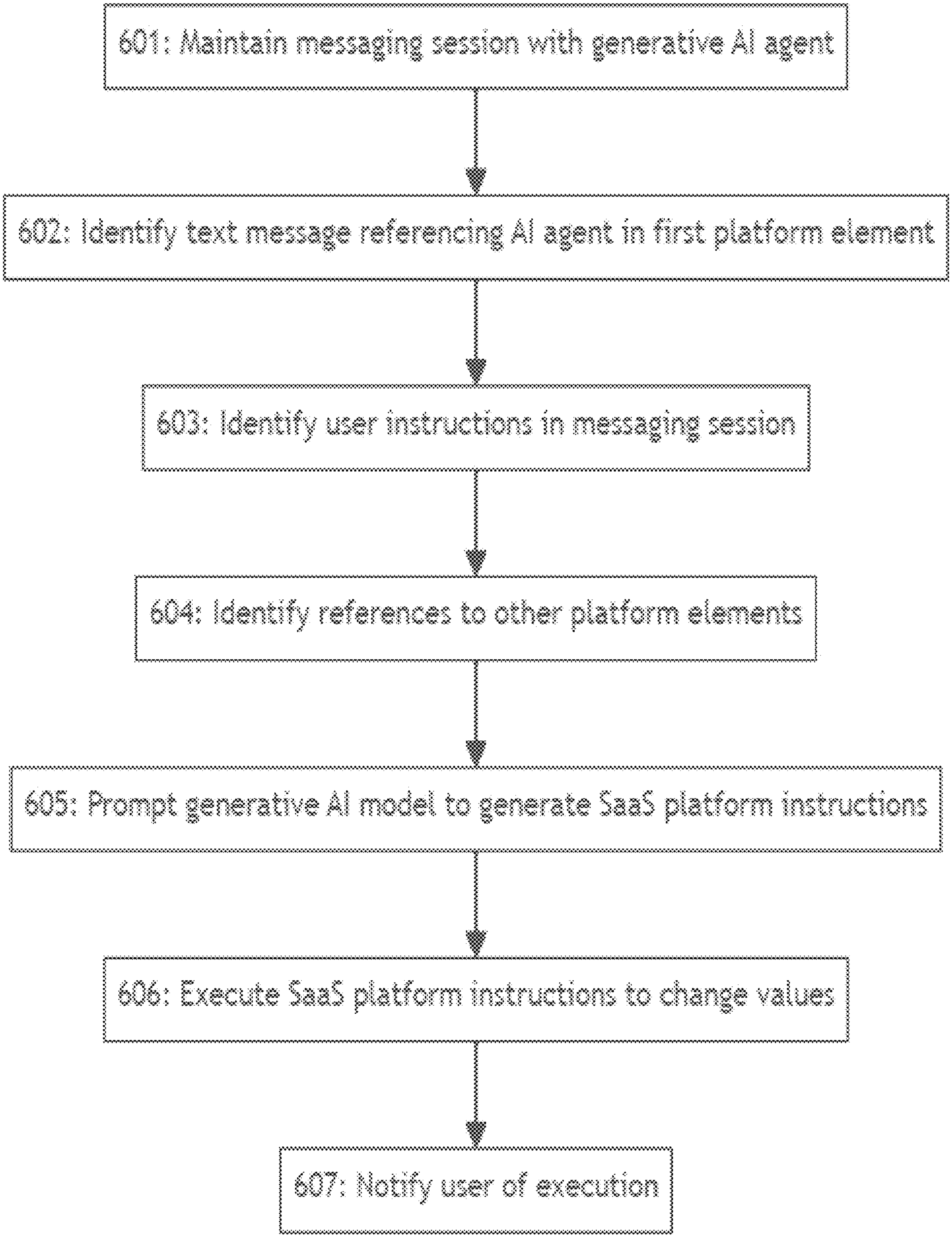
FIG. 6 is a flowchart illustrating a process for operating a SaaS platform with cross-application generative AI agent interaction, according to some embodiments of the present invention.

According to some embodiments of the present invention there are described methods and system for cross-application generative AI agent interaction (FIG. 6). These embodiments enable generative AI agents to perform actions across multiple platform elements or applications based on a single user mention. It significantly enhances workflow efficiency by allowing seamless integration of AI capabilities across different parts of the SaaS platform.

Figure 7:
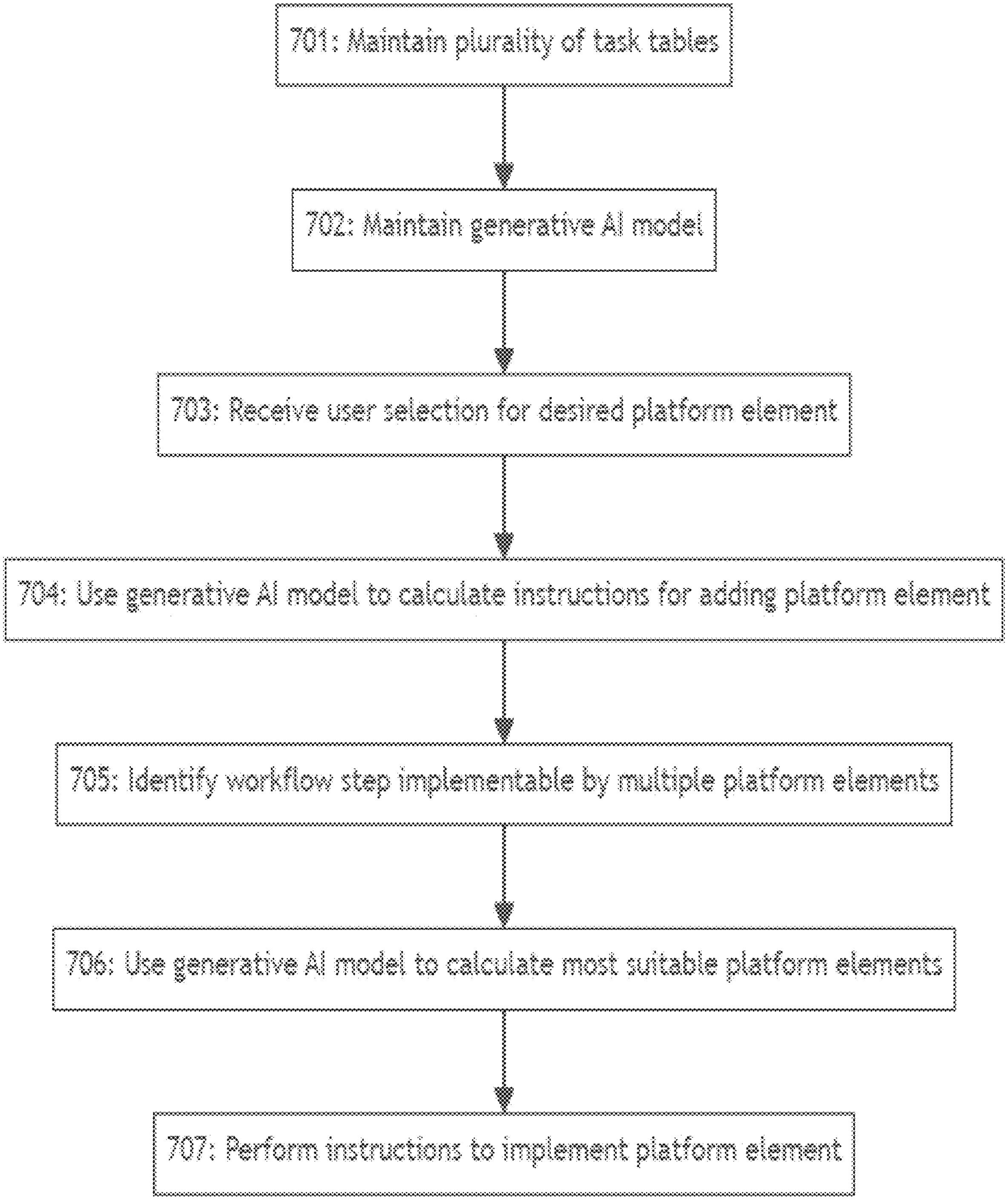
FIG. 7 is a flowchart illustrating a process for using generative artificial intelligence for intent-based interaction with a SaaS platform, according to some embodiments of the present invention.

According to some embodiments of the present invention there are described methods and system for intent-based platform element creation (FIG. 7). These embodiments teach generative AI to create new platform elements based on user requirements. It automates the process of identifying, selecting, and implementing the most suitable components to fulfill user needs, streamlining the customization of SaaS platforms.

Figure 8:
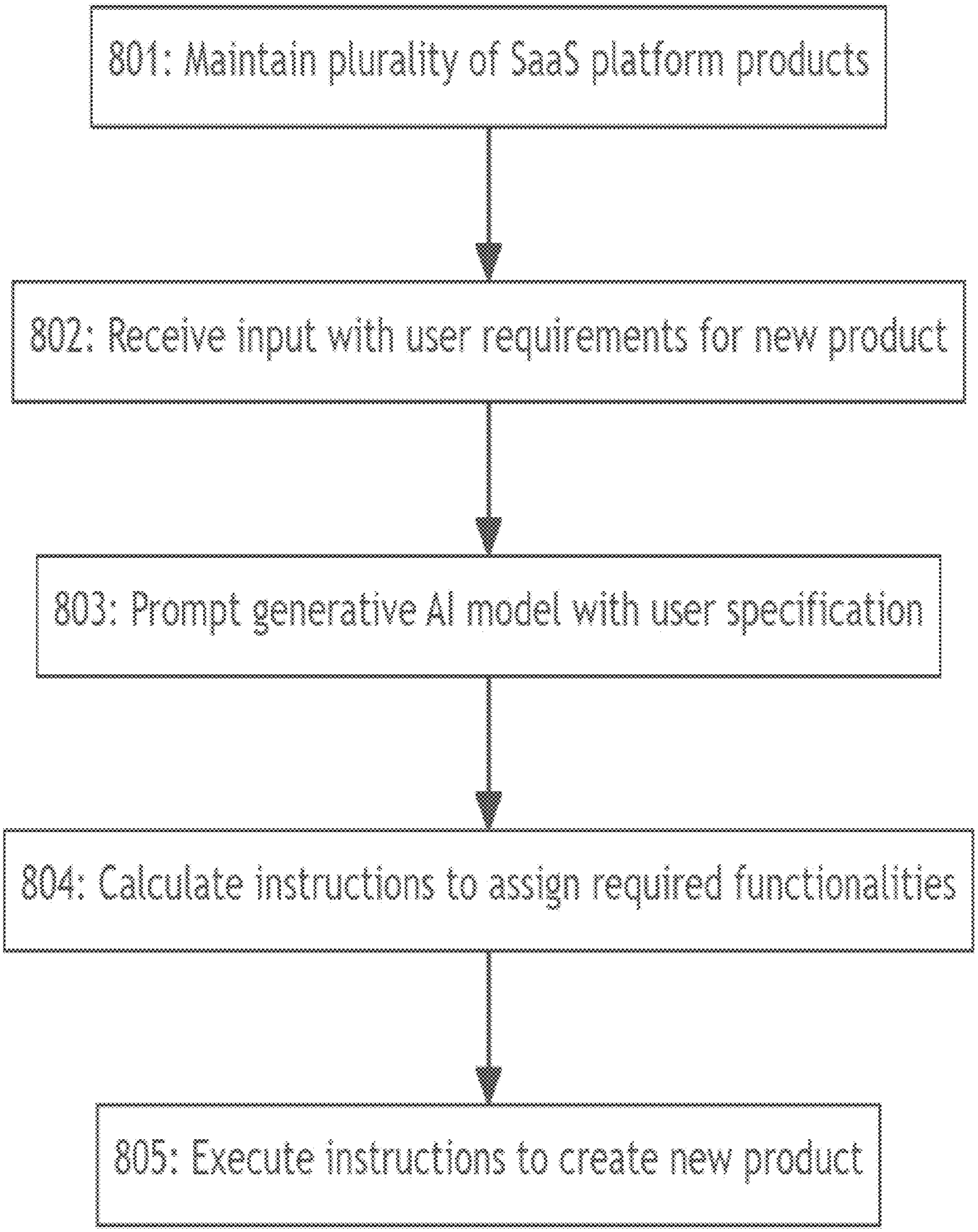
FIG. 8 is a flowchart illustrating a process for using generative artificial intelligence to create custom SaaS platform products, according to some embodiments of the present invention.

According to some embodiments of the present invention there are described methods and system for AI-driven custom product creation (FIG. 8). These inventions detail methods for creating custom SaaS products by combining functionalities from existing products using generative AI. They enable rapid development of tailored solutions that meet specific client requirements without extensive manual development.

Collectively, these inventions represent a significant advancement in the field of SaaS and AI integration. They enable more intuitive data interactions, enhance the adaptability and customization capabilities of SaaS platforms, and leverage AI to automate complex tasks across various aspects of cloud-based software solutions.

The synergy between these inventions creates a powerful ecosystem where AI not only assists in data analysis and interaction but also plays a crucial role in shaping and evolving the SaaS platform itself. This approach positions the SaaS platform to dynamically adapt to user needs, potentially revolutionizing how businesses interact with and benefit from cloud-based software solutions.

By addressing key challenges in data interaction, cross-application functionality, and product customization, these inventions pave the way for next-generation SaaS platforms that are more intelligent, responsive, and aligned with specific business needs.

The methods and systems described herein numerous significant advantages over conventional SaaS platforms and AI integration approaches. These benefits stem directly from the novel architectural choices and implementation strategies outlined in the preceding sections. Enhanced user interaction and productivity wherein the AI-supported cursor state and interactive element generation (as described in FIG. 2A and FIG. 5) significantly streamline user interactions with complex data structures. By allowing users to query and manipulate data through natural language and AI-generated interactive elements, the system reduces cognitive load and increases productivity. For instance, the ability to change multiple cells with a single AI-interpreted command can drastically reduce the time required for data entry and modification tasks.

Moreover, the color-context aware data analysis (FIG. 4) and the generative AI model's ability to interpret data based on visual cues provide a level of contextual understanding previously unattainable in SaaS platforms. This feature enables more nuanced and accurate data interpretation, leading to better decision-making and insights. The system's continuous learning capabilities ensure that it becomes more attuned to user needs and industry-specific requirements over time.

The method for operating across multiple platform elements or applications based on a single mention (FIG. 6) breaks down silos typically found in SaaS environments. This seamless integration across different parts of the platform enhances workflow efficiency and data coherence, providing users with a more unified and powerful toolset.

The system's ability to create custom SaaS platform products by combining functionalities from existing products (FIG. 8) offers unprecedented levels of customization. This feature allows businesses to tailor the SaaS platform to their specific needs without extensive custom development, reducing costs and time-to-market for new solutions.

The generation of interactive elements that maintain visual consistency with source data (FIG. 5) aids in data comprehension and analysis. Users can more easily understand complex data relationships and trends, leading to more informed decision-making.

The hierarchical access control system for generative AI agents ensures that organizations can maintain their existing security protocols and data governance policies while benefiting from advanced AI capabilities. This feature is crucial for industries with strict regulatory requirements, allowing them to leverage AI without compromising on compliance.

The management of AI resources as limited assets enables organizations to optimize their use of AI capabilities. This approach ensures efficient allocation of computational resources, potentially reducing costs associated with AI implementation while maximizing the value derived from these advanced features.

The modular architecture and the system's ability to incorporate new functionalities make it inherently extensible. As new AI technologies emerge, they can be integrated into the existing framework, ensuring that the SaaS platform remains at the cutting edge of technological capabilities.

By integrating these advanced AI capabilities into the core functionality of a SaaS platform, the present invention represents a significant leap forward in business software solutions. It not only enhances current operational efficiencies but also opens up new possibilities for data analysis, decision-making, and process automation that were previously unattainable in traditional SaaS environments.

For clarity, teaching of any method described herein, provides teaching for a system implementing this method and the teaching of any system described herein, provides teaching for a method implemented using this system.

The integration of generative AI capabilities into SaaS platforms, as described in herein, offers numerous significant benefits to users and organizations alike. One primary advantage is the substantial increase in productivity and efficiency. By automating complex tasks and providing intelligent assistance, generative AI agents can significantly reduce the time and effort required for data analysis, decision-making, and routine operations. This allows human users to focus on higher-value activities that require creativity and strategic thinking. The proactive information gathering capability of the generative AI agents and execution of generative AI models addresses a common challenge in project management and team collaboration. By autonomously identifying and collecting missing information, the system minimizes delays and reduces the likelihood of oversights, leading to smoother project execution and improved outcomes. The hierarchical access control system for generative AI agents ensures that organizations can maintain their existing security protocols and data governance policies while benefiting from AI capabilities. This feature allows for the seamless integration of AI into established workflows without compromising sensitive information or disrupting existing organizational structures. The interactive analysis of AI outputs provides a layer of transparency that is crucial for building trust in AI-driven systems. By allowing users to query and understand the reasoning behind AI-generated results, the invention promotes informed decision-making and helps mitigate concerns about the "black box" nature of AI algorithms. The management of AI resources as limited assets enables organizations to optimize their use of AI capabilities. This approach ensures that AI resources are allocated efficiently, preventing overuse or underutilization, and potentially reducing costs associated with AI implementation. The contextual data analysis feature significantly enhances the depth and accuracy of insights that can be derived from structured data. By understanding the nuances of different data types and their relationships, the generative AI agent can provide more meaningful and actionable insights, leading to better-informed business strategies. Furthermore, the intent-based interaction system, which uses generative AI agents with different credential sets, allows for a more personalized and secure user experience. Users can interact with generative AI agents that are appropriately scoped to their needs and permissions, enhancing both the relevance of AI assistance and the overall security of the platform.

As used herein intent-based interaction is a capability of user interaction with a software system where the system interprets the user's underlying intention or goal, rather than relying solely on explicit commands. The system may use natural language processing, context analysis, and machine learning to understand and act on the user's intent, allowing for more intuitive and flexible interactions.

As used herein a generative AI model is a function trained using machine learning technical to receive inputs such as text, image, audio, video, and code and generate new content into any of defined modalities. For example, it can turn text inputs into an image, turn an image into a song, or turn video into text. One example of a language-based generative model is a large language model (LLM). Another example is a model adapted for creation of 3D images, avatars, videos, graphs, and other illustrations. generative AI models can create graphs, realistic images, produce 3D models, logos, enhance or edit existing images, and the like. Another example is a model adapted for generating synthetic data to train generative AI models when data doesn't exist.

As used herein a generative AI agent is a software application or an interface that is designed to mimic human conversation through text or voice interactions based on usage of generative AI models. For example, the generative AI agent is capable of maintaining a conversation with a user in natural language and simulating the way a human would behave as a conversational user of the described SaaS platform. Such agents may use deep learning and natural language processing.

The generative AI model described herein with reference to any of the figures may be used for enabling interactions with the SaaS platform data and user queries. The architecture may be based on a hybrid approach, combining several advanced machine learning techniques such as transformer-based Architecture, similar to GPT (Generative Pre-trained Transformer) models. Multi-head self-attention mechanisms for processing both textual and structured data may be used, for instance with positional encoding to maintain sequence information in input data and/or layer normalization and residual connections for stable training and inference. Optionally, multimodal processing that incorporates separate encoding branches for different data types (text, tabular data, images) is used. Optionally, byte-pair encoding (BPE) for tokenization is used. Entity embeddings for categorical variables and normalized numerical inputs is used for processing tabular data. A convolutional neural network (CNN) backbone, such as Reset or EfficientNet is used for analyzing image built from marked area and/or pixels as described below. Cross-attention layers may be added to allow interaction between different modalities and to enable the model to align information from text queries with relevant parts of tabular or image data. Optionally, in multi-interaction process described herein below, a context buffer is maintained to store relevant information from previous interactions. Attention mechanisms may be used to selectively retrieve and apply contextual information. An autoregressive decoder may be used for generating text responses, optionally, with pointer network for referencing specific parts of the input data in responses and/or a mixture of expert modules for specialized outputs (e.g., SQL generation, data visualizations). As used herein the generative AI model may be an outcome of pre-training on large corpus of SaaS platform data and optionally general knowledge bases. Optionally the model is fine-tuned on specific customer datasets and use cases.

All aspects of the entertainment industry, from video games to film, animation, world building, and virtual reality, are able to leverage generative AI models to help streamline their content creation process. Creators are using generative models as a tool to help supplement their creativity and work.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or table structure as used herein, refers to data presented in horizontal and vertical rows, (e.g., horizontal rows and vertical columns) defining cells in which data is presented. A table structure may refer to any structure for presenting data in an organized manner, as previously discussed such as cells presented in horizontal rows and vertical columns, vertical rows and horizontal columns, a tree data structure, a web chart, or any other structured representation, as explained throughout this disclosure. A cell may refer to a unit of information contained in the table structure defined by the structure of the table. For example, a cell may be defined as an intersection between a horizontal row with a vertical column in a table structure having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, table structure may include any type of information, depending on intended use. As an example, when used in conjunction with a project/task management application, the table structure may include any information associated with one or more tasks, such as one or more status values, projects, time-frames/deadlines, countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a tables or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics (which may also be referred to more generically as "widgets"). In some instances, dashboards may also include table structure. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns, and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures, and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, NLP algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms may provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

- Accessibility: Users may conveniently and securely access software and data from any device with an internet connection.
- Scalability: SaaS platforms may easily scale up or down to accommodate changing business requirements, providing flexibility and cost-effectiveness.
- Cost-effectiveness: By eliminating upfront investments in hardware and software, SaaS may reduce initial costs. Customers may pay subscription fees based on their usage.
- Maintenance and Updates: Service providers handle software maintenance, updates, and security patches, relieving customers of these responsibilities.
- Collaboration: SaaS platforms often offer collaboration features, enabling multiple users to work together, share data, and communicate within the platform.
- Customization: SaaS platforms can offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS platforms may include a plurality of SaaS platform elements which may correspond to components or building blocks of the platform that work together to deliver software applications and services over the Internet. Examples of such elements may include application software, infrastructure, or user interface. For example, a platform may offer project management capabilities to its users via dashboards, tables, text documents, a workflow manager, diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, a workflow block associated with a workflow manager, or management tools. As used herein a SaaS platform element is A discrete component or building block within a SaaS platform that provides specific functionality or serves a particular purpose. These elements can include, but are not limited to, tables, dashboards, workflows, text documents, and applications available through a marketplace. SaaS platform elements can be combined or customized to create tailored solutions within the platform.

FIG. 1A is a block diagram of an exemplary SaaS platform 100 and generative AI environment 200, according to some embodiments of the present invention. Although the generative AI environment 200 is depicted as a separate environment it can be part of the SaaS platform 100 itself. The generative AI environment 200 may be in communication with the SaaS platform 100 as described in any of the embodiments below, for instance via network 205 or directly based on any common software component communication protocols or in the common process of executing software components.

As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency may be achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this process, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This process may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications (e.g., 108) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

As used herein a user account may be associated with a human or *w* generative AI agent. The generative AI agent or a generative AI model executing prompts may be implemented in a computerized generative AI environment 200 using a Core generative AI model 202 that incorporates Natural Language Understanding (NLU) and Natural Language Generation (NLG) capabilities. This Core generative AI model can be a transformer-based model (e.g., GPT-3.5, GPT-4, or open-source alternatives like BERT or T5) executed in a framework such as PyTorch or TensorFlow and deployed on the environment 200 (e.g., part of platform 100 or a separate system communicating with the platform 100) such as an NVIDIA Triton Inference Server or TensorFlow Serving.

When the computerized generative AI environment 200 is executed separately from the platform it may communicate therewith via digital data communication (e.g., a communication network 205). Examples of communication networks include a local area network ("LAN"), a wide area network ("WAN"), and the Internet.

The core model provides the foundation for both NLU and NLG functionalities. It receives processed input from the NLU component and sends raw output to the NLG component for refinement.

The NLU processes incoming messages, extracting intents and entities. It feeds processed information to the Core generative AI model and updates Context Management. The NLG receives raw output from the Core generative AI model, refines it based on context, and produces human-readable responses.

The NLU may be implemented using libraries such as spaCy or NLTK for text processing and intent/entity extraction. The NLG may be implemented using template-based systems like Jinja2 or neural-based approaches such as GPT-3 Application Programming Interface (API) or fine-tuned GPT-2, which receive raw output from the Core generative AI model, refine it based on context from Context Management, and produce human-readable responses.

Optionally, the generative AI agent can be executed as in the generative AI environment 200 or as part of the platform 100 by one or more processors 201. When executed in a separate environment, an API Integration Layer may be implemented to facilitate communication between the generative AI environment 200 and the SaaS platform 100. This layer may include a RESTful API client (e.g., Python requests library), GraphQL client (e.g., gql for Python), and/or OAuth 2.0 for authentication (e.g., authlib library). It sends platform responses to the Core generative AI model and Context Management and receives actions to execute from a decision engine. The decision engine processes information from the Core generative AI model, consults a memory and knowledge base, and determines actions. It then either initiates tasks via the Task Planning Module or generates responses through NLG.

Optionally, the generative AI environment includes a context management module, task planning module, and a decision engine to provide contextual information to the Core generative AI model. The task planning module receives high-level objectives from the decision engine, breaks them down into steps, and coordinates with the API integration layer for execution. The Memory and Knowledge Base component interacts with the Core generative AI model, Decision Engine, and Context Management, providing long-term storage and retrieval of information. It's queried by the Core generative AI model and Decision Engine and updated based on new interactions and learning.

All or some of the components collect data from other components for performance tracking, error detection, and system optimization. In operation, the Decision Engine orchestrates overall behavior, the Task Planning Module manages multi-step processes, and the Context Management ensures coherence across interactions. This interconnected architecture allows for flexible, context-aware interactions while maintaining security and scalability.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Still referring to FIG. 1A, SaaS platform 100 may include one or more management tools that may involve a combination of one or more SaaS platform element or sub-element. For example, a solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach enables users to interact with the data in a more intuitive and engaging manner, facilitating deeper understanding and analysis. Each of these management tools may be coupled to a one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales.

In order to provide meaningful data visualizations, management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). A data structure may include a plurality of items. Examples of items may include but are not limited to a deal, a transaction, a client account, a prospect, a task, a user record, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team.

The plurality of items of a data structure may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

Some disclosed embodiments may involve stored data such as alphanumeric data which are accessible when a user interacts with graphical elements having a plurality of graphical characteristics. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

Figure 1B:
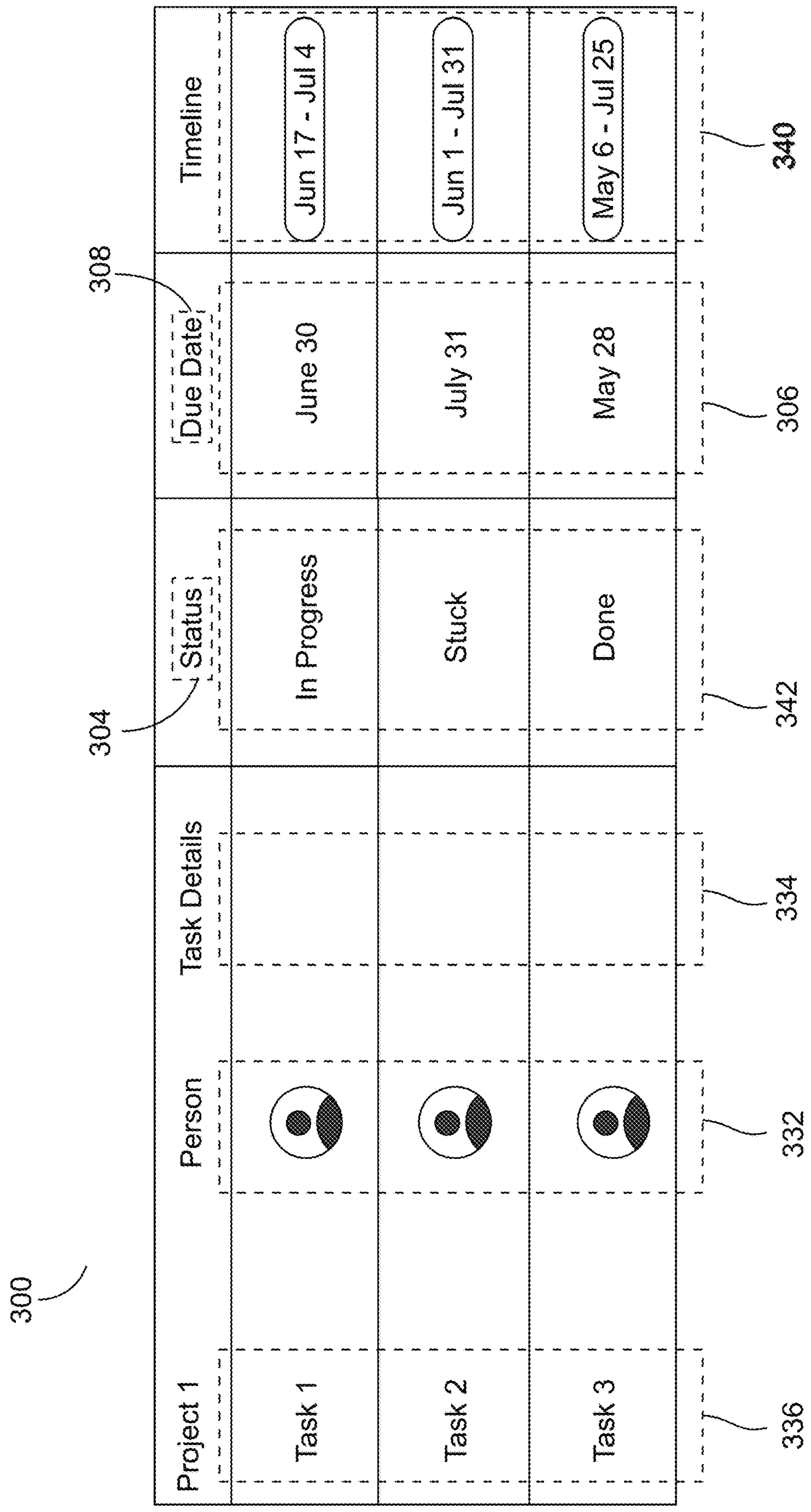
FIG. 1B illustrates an example of a table that includes multiple columns and rows, consistent with some embodiments of the present disclosure.

By way of example with reference to FIG. 1A, a platform 100 may maintain tables 102 by storage, or any combination thereof. FIG. 1B illustrates an exemplary table structure, referred to herein as table 300, that may include multiple columns and rows, consistent with some embodiments of the present disclosure. In some embodiments, the table 300 may be displayed using a computing device (e.g., the computing device or software running thereon). The table 300 may be associated with a project (e.g., "Project 1" in FIG. 1B) and may include, in the multiple rows and columns, tasks (e.g., in rows including "Task 1," Task 2," or "Task 3") and data characteristics for the tasks. Such data characteristics can be persons (e.g., in a column 332), indicating which user entities are associated with the task/are assigned to the tasks, details (e.g., in a column 334) of the tasks, statuses (e.g., in a column 342) of the tasks, due dates (e.g., in a column 336) of the tasks, timelines (e.g., in a column 340) of the tasks, or any other data characteristic of the task. For example, in a project with the common objective of launching a new product, the table might be structured as follows: Task 1 could be "Market Research," assigned to a generative AI Agent. Task 2 might be "Product Design," assigned to John from the R&D department. Task 3 could be "Financial Projections," assigned to Michael from the Finance department. Each task contributes to the common goal of product launch, and people are assigned from the departments most relevant to each task's requirements. This structure enables cooperation across departments to reach the common objective efficiently. The status column might show "In Progress" for Market Research, "Not Started" for Product Design, and "Completed" for Financial Projections, giving a quick overview of the project's progress towards the launch goal. A task may refer to a part or a portion of a project. A task may be performed by an entity (e.g., an individual or a team or a generative AI agent assigned to the task). In some embodiments, a task may be represented by a row of cells in a task table. In some embodiments, a task may be represented by a column of cells of a task table. An entity may refer to an individual, a team, a group, a department, a division, a subsidiary, a company, a contractor, a generative AI agent, or any independent, distinct organization (e.g., a business or a government unit) that has an identity separate from those of its members, or a combination thereof.

As illustrated in FIG. 1B, the at least one processor may maintain a plurality of tables (e.g., including the tables 300) and other information (e.g., metadata) associated with the plurality of tables. Each table (e.g., one of the tables 300) of the plurality of tables may include a plurality of rows (e.g., the rows of "Task 1," Task 2," and "Task 3" in the table 300) and columns (e.g., columns 332, 336, 340, 332, and 334 of the table 300).

Consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate or a generative AI agent), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

In the context of this disclosure, it is important to note that the assignment of a generative AI agent to a cell of a table such as 300 by a user triggers the assignment of that AI agent to the respective task and its associated information, characteristics, or entities of the project as documented in the respective row or column to which the agent is added. This assignment process is designed to be automatic and seamless when the user adds the agent to the respective cell, table, or sub-table. For instance, if a user assigns a generative AI agent to a cell in the "Person" column (332) of a specific task row, the generative AI agent is automatically granted access and assigned to all relevant information pertaining to that task, including its details, status, due date, and/or timeline.

This automatic assignment may extend to any sub-tables or linked data sources associated with that task. Furthermore, the generative AI environment 200 may automatically provision appropriate credentials to the generative AI agent, allowing it to perform actions and access information within the scope of its assigned task. These credentials are dynamically adjusted based on the context of the assignment, ensuring that the AI agent has the necessary permissions to fulfill its role while maintaining data security and access control protocols. This streamlined approach to AI agent assignment and credential management enables efficient integration of AI capabilities into project workflows, enhancing productivity and decision-making processes. As used herein, any assignment of the generative AI agent as a user to task or action may be performed by the addition of the agent by a human user who uses an interactive graphical user interface presenting the respective table to a cell in the respective table, for instance by adding or selecting an avatar of the agent to the cell.

As described herein, when indicating that the generative AI agent is assigned with a role, for instance in a team assigned to a project documented in one or more table structures, the role may be given as an outcome of adding the generative AI agent to a table such as 300, by a user. In use, post adding the agent to a cell, the environment 200 automatically creates a role for that agent based on the context of its assignment. This role definition process is dynamic and contextual, taking into account the specific characteristics of the table, the task, and/or the project as a whole. For example, when an AI agent is assigned to a row having a marketing campaign task indicated in the "Task Details" column (334), the generative AI environment 200 might automatically define its role as a "Content Strategy Assistant." In this role, the AI agent would be granted permissions to analyze past campaign data, suggest content ideas, and even draft preliminary marketing copy. Similarly, if an AI agent is added to a row having a software development task indicated in the "Task Details" column (334), it might be assigned the role of "Project Progress Monitor." In this capacity, the generative AI environment 200 could be authorized to track task completions, identify potential bottlenecks, and send automated status updates to team members. These automatically generated roles are not static; they can evolve based on the AI agent's interactions and performance within the project ecosystem and/or changes in the values of the cells of the table. This dynamic role creation and evolution allow for a flexible and adaptive integration of AI capabilities into diverse project environments, enhancing the overall efficiency and intelligence of the project management process.

Figure 2A:
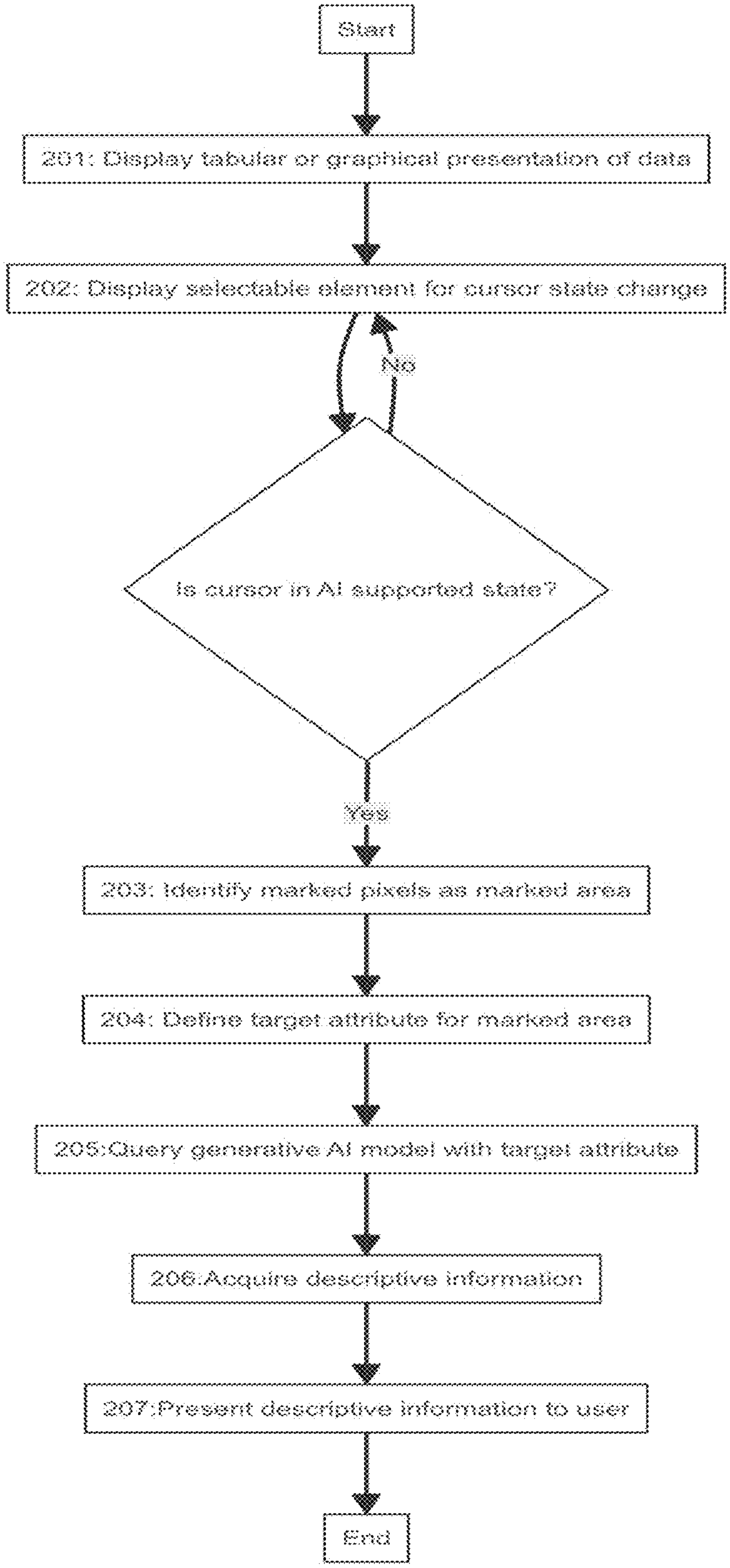
FIG. 2A is a flowchart illustrating a process for querying a generative AI model about structured data in a SaaS platform, according to some embodiments of the present invention.

FIG. 2A is a flowchart of an exemplary process implemented by one or more processors (201) of the generative AI environment 200 for integrating generative AI into a SaaS platform according to some embodiments of the present invention. The process is optionally executed using the generative AI environment 200 or by the exemplary SaaS platform 100 and the generative AI environment 200.

The flowchart is implemented using a SaaS platform, such as the system depicted in FIG. 1A, according to some embodiments of the present invention, for instance using the generative AI environment 200.

The flowchart illustrates an exemplary process for querying a generative AI model about structured data in a SaaS platform, according to some embodiments of the present invention. The process is optionally executed using the AI environment 200 or by the exemplary SaaS platform 100 and the generative AI environment 200. Reference is also made to FIGS. 2B-2E which are screenshots on exemplary tabular presentation of data on a user interface of the SaaS platform 100, together with an example of a selectable element that allows a user to change the status of a graphical cursor and/or the effect of using the graphical cursor in an AI-supported state according to some embodiments of the present invention. As used herein, an AI-supported state is a mode of operation within a software interface where a generative AI model is actively engaged to assist with user interactions. In this state, user actions (such as selecting data or issuing commands) are interpreted and processed by the generative AI environment 200 to provide enhanced functionality, insights, or automated actions beyond what is available in the standard interface state.

Figure 2B:
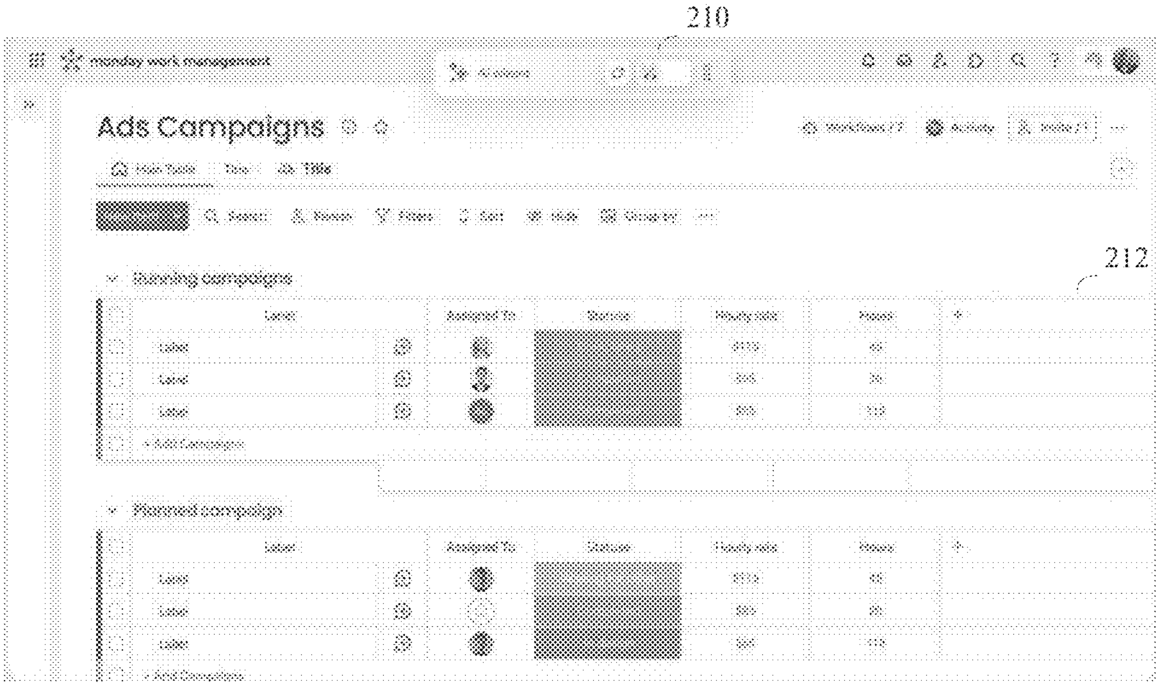
FIG. 2B depicts an example user interface showing a selectable element for changing the cursor state and AI-supported functionality, according to some embodiments of the present invention.

As shown at 201, the platform 100 displays a tabular or graphical presentation of data on a user interface of the SaaS platform, such as board 212 in FIG. 2B. This presentation may include project management data, sales data, or any other structured data relevant to the platform's functionality. Optionally, the display is on a computer monitor, laptop screen, tablet, or even a large touchscreen display for collaborative environments.

As shown at 202, the platform 100 instructs displaying a selectable element that allows a user to change the status of a graphical cursor from a general state to an AI-supported state. This selectable element may be implemented as a graphical button or virtual toggle switch within the user interface, such as toggle 210 in FIG. 2B. As used herein, an AI-supported functionality is a state wherein a generative model is queried about data or elements marked by the curser, optionally together with additional data.

Alternatively, changing the status of the graphical cursor to the AI-supported state replaces standard mouse functionality with AI-dedicated functionality. This may involve altering the behavior of mouse clicks or hover actions to trigger AI queries instead of standard interface interactions operated by common input devices. In some cases, the graphic icon of the curser itself may be changed to reflect the change in the state, for instance, the icon can be presented as a wand instead of an arrow, as depicted in icon 213 of FIG. 2C.

Optionally, the selectable element can be a physical button mounted on an input device. For example, a dedicated button on a mouse could be toggled between normal and AI-supported modes, a specific key or key combination on a keyboard (e.g., "AI Mode" key or Ctrl+Shift+A) could switch cursor states. In another example, for touchscreen devices, a physical button on the device's frame could be toggled to activate AI mode. This physical implementation provides tactile feedback and allows users to switch modes without navigating on-screen menus, potentially speeding up workflows.

Optionally, when the curser is in an AI-supported state, its regular operation method is changed. For example, normal left-click operations that were used for selecting or activating elements can be replaced with AI query triggers specific to the clicked item and/or area. Optionally, drag operations initiate area-based AI analysis and/or group analysis for the dragged object and the dropped area and/or item instead of moving or resizing elements. Optionally, hover actions show AI-generated tooltips with insights about the hovered element and/or area instead of standard information. This transformation essentially turns the cursor into an "AI probe" for exploring the data.

Optionally, the generative AI model is trained on historical project data. This training improves the model's ability to identify relevant platform elements and actions, enhancing its effectiveness over time. Optionally, the SaaS platform data queried in this process is stored as a plurality of items representing the data in tables, underlining the structured nature of the data being analysed.

As shown at 203, when the graphical cursor is in the AI-supported state, the generative AI environment 200 identifies an area, for instance a plurality of pixels, marked by the user using the graphical cursor. These marked pixels define a region of interest within the tabular or graphical presentation, which is referred to as the marked area. As used herein the curser covers a mouse curser or a touchscreen finger indicator and.ir any other graphical element facilitating a user to mark a displayed area.

This can involve the generative AI environment 200 identifying an area, for example a plurality of pixels, marked by the user using the graphical cursor when it is in the AI-supported state. This marked area defines a region of interest within the tabular or graphical presentation.

The marked area may be an area confined, fully or partly, in a scribble drawn using the graphical cursor when it is in the AI-supported state. The marked area may be an area that was clicked on using the graphical cursor when it is in the AI-supported state.

Example 1: Cells in a Table

In the case of a tabular presentation, the marked area could correspond to one or more cells within the table. For instance:

1. Single Cell Selection: The user might select a single cell in a project management table. For example, the cell contains the value "Q3 2024" in the "Deadline" column for a specific task. The generative AI environment 200 would identify the pixels encompassing this cell as the marked area.
2. Multiple Cell Selection: The user could drag the cursor to select multiple adjacent cells. For example, in a sales data table, they might select a range of cells showing monthly revenue figures for a particular product line over the past year. The generative AI environment 200 would identify all the pixels covering these selected cells as the marked area. Reference numeral 223 in FIG. 2C exemplifies a multi cell selection as the curser is dragged to select a group of cells from 2 different columns. FIG. 2E exemplifies a selection of cells in a column as the curser is placed on top of the header of the column.
3. Non-Contiguous Selection: Some interfaces allow for selecting non-adjacent cells by holding a modifier key (e.g., Ctrl or Cmd) while clicking. The user might select several cells from the "Status" column for different tasks. The generative AI environment 200 would identify the pixels of these non-contiguous cells as separate parts of the marked area.

Example 2: Point in a Graph

For a graphical presentation, such as a line graph, bar chart, or scatter plot, the marked area could be a specific point or region on the graph. For instance:

1. Single Point Selection: In a line graph showing website traffic over time, the user might click on a specific point representing a traffic spike. The generative AI environment 200 would identify the pixels around this point as the marked area, potentially including both the x and y axis values (e.g., the date and the traffic count).
2. Bar Selection: In a bar chart comparing quarterly sales across different regions, the user might select a particular bar. The generative AI environment 200 would identify the pixels comprising this bar as the marked area, encompassing both the height of the bar (representing the sales value) and its category (the specific region and quarter).
3. Area Selection: In a scatter plot showing customer lifetime value versus acquisition cost, the user might drag to select a cluster of points. The generative AI environment 200 would identify relevant pixels within this dragged area as the marked area, potentially including multiple data points.

In all these cases, the generative AI environment 200 can be configured to recognize the GUI elements that the user interacts with using the GUI input devices. According to one exemplary embodiment to implement the above, the generative AI environment 200 can translate the user's physical interaction with the interface (via mouse, touchpad, touchscreen or the like) into a set of selected pixels. These pixels are then mapped back to the underlying data they represent, whether that's specific cell values in a table or data points in a graph. This mapping allows the generative AI environment 200 to determine the target attribute(s), which forms the basis of the query to the generative AI model in the following steps.

Optionally, the surroundings of the selected area are analyzed to provide context. For example, in a table, it might consider column and row headers, adjacent cells, and any applied filters or sorting. In a graph, it could look at axis labels, legends, and overall trends in the data. It might also consider user-specific context, like their role, recent activities, or frequently accessed data. This context enriches the AI query, allowing for more nuanced and relevant responses.

As shown at 204, the generative AI environment 200 determines at least one target attribute for the marked area. This target attribute may be based on the data contained within the marked area or the context of the surrounding data.

Figure 2C:
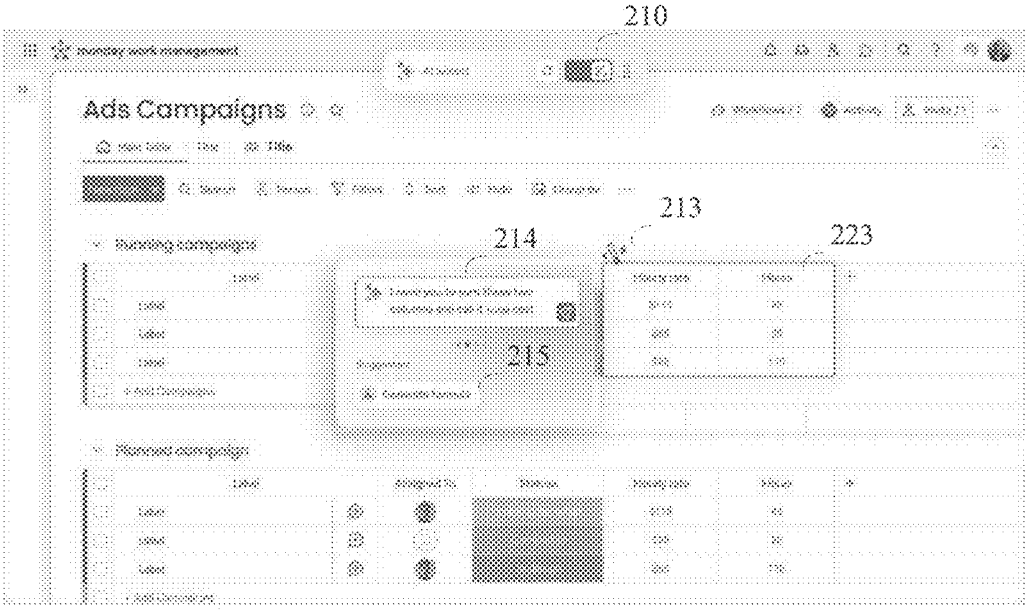
FIG. 2C illustrates an example of multi-cell selection in AI-supported state, according to some embodiments of the present invention.
Figure 2D:
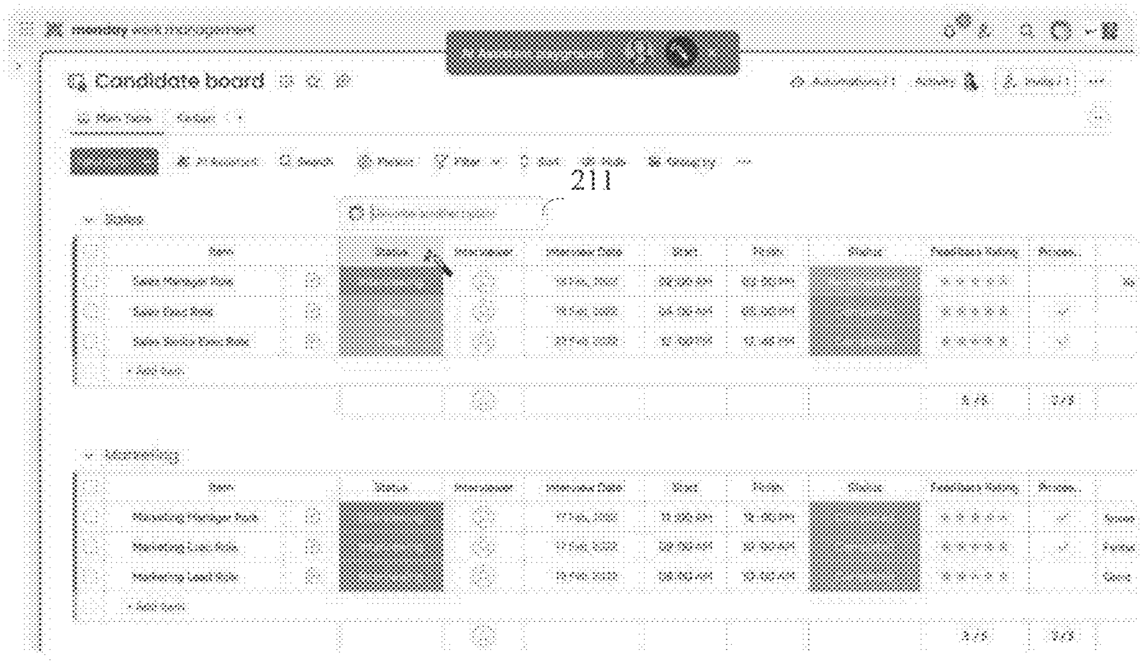
FIG. 2D shows an example of column selection and a chat interface for user queries, according to some embodiments of the present invention.
Figure 2E:
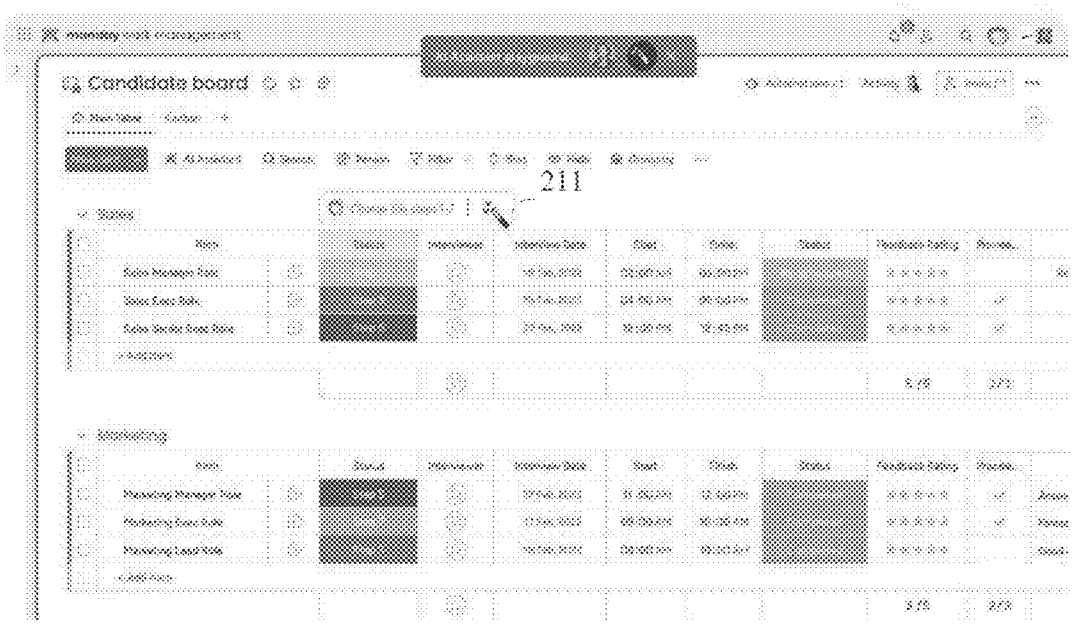
FIG. 2E depicts the result of AI-driven data transformation based on user query, according to some embodiments of the present invention.

Optionally, as illustrated by element 211 in FIGS. 2D and 2E and in 214 in FIG. 2C, the generative AI environment 200 incorporates a command line interface, also referred to as a chat box, to enable users to define specific prompts regarding the marked area. This feature enhances the AI-supported functionality by allowing for more precise and customized queries. As used herein, an AI-supported functionality is a state wherein a generative model is queried about data, GUI elements or data within the context of or more GUI elements marked by the user (e.g., with a curser).

For instance, in FIG. 2D, the user has selected a status column to be processed by the generative AI model. Upon this selection, the generative AI environment 200 presents the chat box 211, providing an interface for the user to input additional queries related to their selection. In the illustrated example, the user has entered the query "change these steps 1-7" in association with the selected status column.

The generative AI model then interprets the user's intent based on this input and the selected data. In this case, the model deduces that the user wishes to transform the status descriptions from textual representations of process steps to numerical representations indicating the step's position in the sequence.

Following this interpretation, the generative AI model proceeds to modify the status values accordingly. As shown in FIG. 2E, the transformation has been applied. For example, the status 'open position', which represents the initial step in a seven-stage recruitment process, has been changed to 'step 1'. This modification is applied consistently across all status entries, converting each textual description to its corresponding numerical step in the process.

This functionality demonstrates the generative AI model's capability to understand context, interpret natural language queries, and execute data transformations based on user intent. It showcases the system's ability to bridge the gap between user-friendly, natural language interactions and structured data manipulations within the SaaS platform.

As shown at 205, the generative AI environment 200 queries the generative AI model with the target attribute. The generative AI model may be a large language model or other machine learning model trained on relevant domain knowledge and data structures similar to those used in the SaaS platform.

Optionally, different mouse-click operations in the AI-supported state trigger different AI functionalities. For example, a left-click might initiate an AI query based on visual and contextual information from the marked area, while a right-click could generate automatic suggestions for the clicked portion of the display. The suggestions may be presented in a user interface popped out in proximity to the curser as shown in 215 of FIG. 2B. Optionally, middle-click (or scroll wheel click) might compare the selected data point to relevant benchmarks or historical data. Optionally, double-click could initiate a deep-dive analysis, providing exhaustive details about the selected data. This approach gives users quick access to different levels and types of AI assistance. The AI-dedicated functionality may enable the user to question specific portions of the displayed GUI elements for information. This could involve presenting an input user interface adapted to receive targeted queries from the user about the selected data. The generative AI environment 200 may also determine a context of the target attribute within the data presentation and include this context in the query to the generative AI model. This context-aware querying can provide more relevant and insightful responses from the generative AI model.

As shown at 206, the generative AI environment 200 acquires descriptive information about the targeted one or more attributes from the generative AI model. This descriptive information may include insights, analysis, or recommendations based on the queried data.

As shown at 207, the generative AI environment 200 presents the acquired descriptive information to the user, optionally through the user interface of the SaaS platform. In some embodiments, the descriptive information returned by the generative AI model includes recommendations based on the determined context of the target attribute. These recommendations may suggest actions, highlight trends, or provide predictive insights based on the queried data and its context.

The acquired descriptive information may be presented as interactive elements within a messaging interface. In such embodiments, the generative AI environment 200 maintains a chat-like interface where users can converse with the generative AI environment 200 about the data. For example, when the generative AI environment 200 references specific data points or sets, it can generate interactive elements that users may manipulate directly in the chat. These elements may share the same graphical characteristics (color schemes, fonts, styles) as the original data presentation in boards of the SaaS platform, for consistency. For example, if discussing sales data, the generative AI environment 200 might generate a mini bar chart in the chat that users can click on to see more details or even modify to see how changes might affect projections.

Optionally, generative AI environment 200's responses can include actionable recommendations. For example, for a sales dashboard, it might suggest focusing on high-performing products or regions and in a project management context, it could recommend resource reallocation based on task progress and deadlines. In another example, for financial data, it might propose investment strategies or cost-cutting measures based on observed trends. These recommendations would be tailored to the user's role and the specific context of the queried data. In some cases, the recommendations can be shown in association with corresponding buttons, and upon selection thereof, the recommendations can be performed by the AI agent. The generative AI environment 200 may implement a dynamic recommendation interface within the SaaS platform's graphical user interface. This interface can be manifested in multiple forms:

1. Inline Buttons: The generative AI environment 200 may render actionable buttons directly adjacent to or below the textual recommendation in the generative AI environment 200's response. These buttons are dynamically generated based on the content of the recommendation and are visually consistent with the platform's design language.
2. Floating Action Panel: A semi-transparent panel may appear at the edge of the user's screen, containing a list of recommended actions represented as clickable buttons. This panel can be collapsed or expanded as needed.
3. Context Menu Integration: The generative AI environment 200 may integrate recommendation buttons into the right-click context menu of relevant data elements within the SaaS platform interface.
4. Modal Dialog: For complex recommendations requiring multiple steps or confirmations, the generative AI environment 200 may present a modal dialog box containing the recommendation details and associated action buttons.

The placement and visual styling of these buttons are determined dynamically based on factors such as screen real estate, user preferences, and/or the nature of the recommendation. Upon user selection of a recommendation button, the generative AI environment 200 initiates a multi-step process with some or all of the following:

1. Action Validation: The AI agent first validates the current state of the generative AI environment 200 to ensure the recommended action is still applicable.
2. Permission Check: The generative AI environment 200 verifies that the user has the necessary permissions to execute the recommended action.
4. Resource Allocation: If required, the generative AI environment 200 allocates necessary computational resources to perform the action.
5. Execution: The AI agent leverages its integration with the SaaS platform's API to execute the recommended action. This may involve updating database records, modifying configurations, triggering workflows, and/or generating reports.
6. Real-time Feedback: As the action is being performed, the generative AI environment 200 provides real-time visual feedback to the user, such as progress bars or status messages.
7. Outcome Verification: Post-execution, the AI agent verifies the outcome of the action against the expected result.
8. User Notification: The generative AI environment 200 notifies the user of the action's completion and any relevant outcomes or next steps.

9. Logging and Learning: The generative AI environment 200 logs the execution of the recommendation and its outcomes, feeding this data back into the AI model to improve future recommendations.

This real-time interaction allows for quick what-if scenarios and immediate data manipulation based on AI insights. Optionally, a visual consistency is maintained between presentation of original data in the area indicated by the curser and AI-generated interactive elements generated to present the descriptive information. For example, color schemes are matched, so a "warning" color in the original data (e.g., red for overdue tasks) is used consistently in the interactive elements. Optionally, Fonts are kept the same for readability and brand consistency. Optionally, sizes of elements are proportionally scaled to fit within the messaging interface while maintaining relative size relationships from the original data. This consistency allows users to quickly understand the relationship between the AI-generated elements and the source data.

Optionally, the generative AI environment 200 can be specifically trained to understand and reproduce the graphical elements of the SaaS platform. Optionally, the model learns the design language of the platform, including standard chart types, color codes, and icon usage and use it to scale and adapt visualizations for different contexts (e.g., full dashboard vs. chat interface). Optionally, SVG or other vector formats are generated using the model to ensure high-quality graphics at any scale. This specialized training allows the generative AI environment 200 to create visualizations that feel native to the platform, enhancing the user experience.

Optionally, the interactive elements are set to allow immediate update of data in the related data structure. When a user modifies a value using an AI-generated interactive element, the change is instantly reflected in the original data structure. Websockets or similar technology may be used to ensure real-time synchronization across all views of the data. Optionally, visual cues (like brief highlighting or animations) could be used to draw attention to the updated values in the main data presentation.

Optionally, the AI environment 200 may also maintain a history of queries and corresponding descriptive information. This historical data can be used to improve subsequent queries to the generative AI model, enhancing the relevance and accuracy of the generative AI environment 200's responses over time. The AI environment 200 can be configured to maintain a log of user queries and AI responses. It may track which types of queries users frequently make about certain data types and/or record which AI responses users find most helpful (perhaps through user feedback mechanisms). Optionally, over time, the generative AI environment 200 can learn to prioritize certain types of insights or analysis based on user behavior. This historical data allows the AI environment 200 to become more personalized and effective in its responses, anticipating user needs and providing increasingly relevant information. By implementing these features, the SaaS platform creates a sophisticated, context-aware AI assistant that can significantly enhance data analysis and decision-making processes for users across various roles and industries.

As indicated above with reference to 211 and 214 a context-sensitive input field such as the depicted chat box appears near the cursor when clicking in AI mode. Optionally, voice input activation button for asking questions about the selected area is provided. The context-sensitive input field may include a structured query builder that allows users to formulate complex questions about the data through a series of dropdown menus or checkboxes. These interfaces would be designed to help users articulate their questions about the data in ways the generative AI environment 200 can effectively process.

Optionally, the generative AI model can be trained based on project management information and/or access data that includes the project management information. For example, charts showing task dependencies and timelines, burndown charts tracking project progress, resource allocation tables displaying team member assignments, risk assessment matrices, and budget tracking spreadsheets. The generative AI model provides insights such as identifying critical path tasks, suggesting resource reallocation, or predicting potential delays based on current progress.

In one embodiment of the present invention, the generative AI model employs an architecture based on the transformer model, similar to GPT (Generative Pre-trained Transformer). The model comprises an encoder-decoder structure with multiple layers of self-attention mechanisms and feed-forward neural networks. The encoder portion of the model consists of N identical layers, where N is an integer greater than or equal to 6. Each encoder layer comprises two sub-layers: a multi-head self-attention mechanism and a position-wise fully connected feed-forward network. Layer normalization is applied to each sub-layer, followed by a residual connection around each normalized sub-layer.

The decoder portion also consists of N identical layers. In addition to the two sub-layers in each encoder layer, the decoder inserts a third sub-layer, which performs multi-head attention over the output of the encoder stack. Similar to the encoder, layer normalization and residual connections are employed around each sub-layer.

The multi-head attention mechanism allows the model to jointly attend to information from different representation subspaces at different positions. This is achieved by linearly projecting the queries, keys, and values h times with different, learned linear projections, where h is an integer greater than or equal to 8. These projected versions are then processed in parallel, yielding h output values that are concatenated and once again projected, resulting in the final output.

The model may be pre-trained on a large corpus of SaaS platform data, including but not limited to: user interactions, workflow patterns, data structures, and domain-specific information relevant to various SaaS applications. Fine-tuning can be performed using transfer learning techniques to adapt the model to specific SaaS environments and use cases.

In some cases, the integration of the generative AI model into the SaaS platform is achieved through a modular, microservices-based architecture of the generative AI environment 200. This architecture ensures loose coupling between the AI components and the existing SaaS platform, allowing for flexibility and scalability.

A dedicated AI Service, which can be an aggregation of more than one service, can act as an intermediary between the SaaS platform and the generative AI model. This service may be responsible for one or more of:

1. Request Handling: Receiving and pre-processing requests from various SaaS platform components.
2. Context Management: Maintaining and updating contextual information for each user session.
3. Model Invocation: Sending appropriately formatted prompts to the generative AI model and receiving responses.
4. Response Processing: Post-processing model outputs for integration back into the SaaS platform.

The AI Service may communicate with the SaaS platform components via a RESTful API, using JSON for data interchange. For real-time updates and notifications, a Web Socket protocol is implemented, allowing for bidirectional communication between the AI Service and the SaaS platform.

To manage data flow and ensure consistency, an Event Bus may be implemented using a publish-subscribe pattern. This allows different components of the SaaS platform to subscribe to relevant AI-generated events and updates.

A Feature Flag system may be incorporated to enable gradual rollout of AI capabilities and easy toggling of features. This system allows for A/B testing of different AI functionalities and graceful degradation in case of AI service interruptions.

Data synchronization between the AI model and the SaaS platform can be achieved through a combination of batch processing for large-scale updates and real-time streaming for immediate changes. A Change Data Capture (CDC) system monitors the SaaS platform's databases for updates, ensuring the AI model always has access to the most current data.

The integration may be containerized using Docker, with orchestration handled by Kubernetes, allowing for easy deployment, scaling, and management of the AI services across different environments. This architecture ensures seamless integration of the generative AI capabilities into the SaaS platform, providing a robust, scalable, and flexible system that can adapt to changing requirements and growing data volumes.

Reference is now also made to FIG. 3 which illustrates a flowchart depicting a computer-implemented process for querying a generative AI model about information presented by a Software as a Service (SaaS) platform according to some embodiments of the present invention. The process enhances user interaction with complex data structures and leverages AI capabilities to provide actionable insights.

The process is optionally executed using the generative AI environment 200 or by the exemplary SaaS platform 100 and the generative AI environment 200.

As shown at step 301, an artificial intelligence (AI) agent is maintained for instance by the generative AI environment 200. For instance, as described in co-filed application titled methods for implementing artificial intelligence capabilities in software applications (PCT Patent Application No. PCT/IL2024/050820 having International filing date of Aug. 14, 2024) which is incorporated which the content thereof is incorporated herein by reference. This generative AI agent is uniquely configured to interact with SaaS platform data of a project, functioning as a virtual team member assigned to the project. This configuration allows the generative AI agent to understand the context and nuances of the project data, much like a human team member would.

As described in this document, the generative AI agent may be executed to act as an expert collaborator having a variety of specialized functionalities. These range from assisting with daily tasks to managing complex team dynamics. The following sections detail an example of how the AI agent leverages its understanding of the software platform and user behavior to provide tailored, context-aware assistance across different scenarios.

Optionally, the generative AI agent can be based on a generative AI model that is trained on historical project data of the SaaS platform. This training improves the model's ability to identify relevant platform elements and actions, enhancing its effectiveness over time. Optionally, the SaaS platform data queried in this process is stored as a plurality of items representing the data in tables, underlining the structured nature of the data being analysed.

Optionally, the generative AI model employed in this process is trained on historical project data. This training improves the model's ability to identify relevant platform elements and actions, enhancing its effectiveness over time and allowing it to learn from past interactions and outcomes.

At step 302, the SaaS platform data is displayed on a screen. This data is presented in at least one tabular structure comprising a plurality of interactive cells. The interactive nature of these cells allows users to engage directly with the data, such as data shown and/or stored in tabular structure (s), setting the stage for more complex interactions.

Subsequently, as shown at 303, the generative AI environment 200 identifies a portion of the screen marked by the user. This identification is facilitated through a graphical user interface (GUI) controlling device, which may include, but is not limited to, a mouse, touchpad, or touchscreen interface.

In one embodiment, the process of identifying the portion of the screen is refined to include a two-step analysis. First, the generative AI environment 200 determines the number of UI elements selected within the marked area. This quantification allows for a more granular understanding of the user's selection. Subsequently, the generative AI environment 200 associates the selected UI elements into one or more subgroups based on their characteristics. This subgrouping enables more nuanced interpretation of the user's intent and facilitates more accurate AI responses.

Building upon this subgrouping capability, the generative AI environment 200 can identify similar UI elements, such as headlines or columns, and group them together. This grouping occurs regardless of the total number of individual elements selected, allowing for intelligent categorization of diverse data sets within a single selection. Such functionality is particularly useful in complex SaaS environments with multifaceted data structures.

Optionally, contextual analysis is used by the generative AI environment 200 within the identified portion of the table structure. This analysis informs the subsequent querying process, ensuring that the generative AI model's interpretation is grounded in the broader data landscape. By considering the context, the generative AI environment 200 can provide more relevant and accurate responses to user queries.

When identifying platform elements, the generative AI environment 200 may consider both the marked portion and the context of the surrounding data in the table structure. This dual consideration allows for more accurate and relevant element identification, enhancing the generative AI environment 200's ability to understand and respond to user queries.

Following the identification of the marked portion, as shown at 304, the generative AI environment 200 queries the generative AI model with this identified portion of the screen. This querying process is multi-faceted and comprises three primary operations:

Firstly, as shown at 304, the generative AI environment 200 identifies one or more platform elements included in the identified portion. These elements may encompass various components of the SaaS platform, such as specific data fields, UI components, or functional modules.

Secondly, as shown at 304B, the generative AI environment 200 determines relationships between the identified platform elements. This determination may involve analyzing data dependencies, functional connections, or hierarchical structures within the SaaS platform.

Thirdly, as shown at 304C, the generative AI environment 200 determines at least one action to perform on the identified platform elements. This determination is based on the previously established relationships and the context of the user's interaction.

Finally, as shown at 305, the process culminates in instructing the generative AI agent to notify the user of performable actions. These actions are specifically tailored to suit the determined relationships and the identified platform elements, ensuring relevance and utility to the user's current context within the SaaS platform.

This process enables more intuitive and context-aware interactions between users and complex data structures. By leveraging artificial intelligence to interpret user actions and suggest relevant operations, the present invention enhances productivity and user experience in SaaS environments.

In some implementations, the actions determined by the generative AI environment 200 include providing context-based recommendations. These recommendations leverage the generative AI environment 200's understanding of the data context and potential user needs, offering valuable insights and suggestions for user action.

The process may also include a mechanism for updating the table structure to reflect changes made by the generative AI agent after performing actions. This ensures that the displayed data remains current and consistent with any AI-driven modifications, maintaining data integrity across the SaaS platform.

To enhance user control and understanding, the generative AI environment 200 may present a preview of the determined action(s) to the user before instructing the generative AI agent to perform them. This preview step allows for user validation and ensures transparency in AI-driven actions.

The generative AI environment 200 also employs different AI behaviors based on the nature of the identified portion. For example, when two columns are selected, the generative AI environment 200 provides automation encompassing both columns. When an action icon is selected, the generative AI environment 200 assesses its relevance to the displayed table. For selections with unconnected elements, the user may be presented with a request for clarification. Selections with mostly connected elements trigger comprehensive generative AI environment 200 output.

Lastly, it's noted that the SaaS platform data queried in this process may be stored as a plurality of items representing the data in tables. This structured storage approach underlies the generative AI environment 200's ability to efficiently process and analyze complex data sets.

Optionally, the generative AI environment 200 dynamically adapts to various user selection patterns. When a user selects two columns within the table structure, the generative AI environment 200 automatically recognizes this as a potential comparative analysis scenario. In response, it initiates an automated process that encompasses both columns, providing insights that may include correlation analysis, trend comparisons, or other relevant statistical evaluations. This feature significantly reduces the time and effort required for users to perform complex data analyses.

Furthermore, the generative AI environment 200 demonstrates contextual awareness when dealing with action icons within the table structure. Upon selection of such an icon, the generative AI environment 200 doesn't merely execute the associated action blindly. Instead, it performs a rapid relevance assessment, evaluating whether the action is appropriate or recommended for the current state of the displayed table. This intelligent filtering helps prevent inadvertent data manipulations and guides users towards more meaningful interactions with their data.

As indicated above, the SaaS platform data may be stored as a plurality of items representing the data in tables. This tabular structure provides a robust foundation for data organization, facilitating efficient querying, analysis, and manipulation by both the generative AI environment 200 and human users. The structured nature of the data storage also enables more accurate context interpretation and relationship mapping between different data elements.

Reference is also made to FIG. 4 that illustrates a flowchart depicting a computer-implemented process for querying a generative artificial intelligence (AI) model about color context in structured data, according to some embodiments of the present invention. The process is optionally executed using the generative AI environment 200 or by the exemplary SaaS platform 100 and the generative AI environment 200.

This process enhances data analysis by incorporating color-based context into AI interpretations. FIG. 4 illustrates a color-context aware data analysis system implemented within a SaaS platform environment. As used herein a color-context aware data analysis is a method of data analysis that incorporates the semantic meaning of colors used in data presentation to enhance interpretation and insights. This approach allows a generative AI model to consider color-based context when analyzing structured data, potentially leading to more nuanced and accurate interpretations based on industry-specific or user-defined color-coding conventions. The system utilizes a generative AI model to interpret and analyze tabular data structures with a unique focus on color-based context. At the core of the system is a neural network-based generative AI model that optionally has been trained on vast datasets of color-coded information. This model employs a combination of neural networks (NNs) for processing visual data and transformer architectures for understanding contextual relationships. The model's training process involves techniques such as transfer learning and fine-tuning to recognize industry-specific color conventions and their semantic meanings.

As shown at 401, a tabular data structure is maintained, for instance by the SaaS platform 100. The tabular data structure may be implemented as a multi-dimensional array, where each cell not only contains alphanumeric data but also metadata about its visual properties, including color values (e.g., RGB), opacity, and other graphic attributes. This rich data structure allows for responding to queries from a user as described below. The queries can target both content and visual characteristics simultaneously as exemplified below. This rich data structure may serve as the foundation for the color-context analysis. In parallel, at 402, this tabular data structure is displayed to the user, allowing for visual interaction with the data. The tabular data structure may be part of a Software as a Service (SaaS) platform interface or any other cloud-based business software environment.

In one example, the SaaS platform 100 maintains a two-dimensional tabular structure with rich metadata. Each cell within this structure contains not only alphanumeric data but also comprehensive metadata detailing its visual properties. These properties include, but are not limited to, color values (such as RGB), opacity levels, and various other graphic attributes. This enriched data structure facilitates complex queries that can simultaneously target both content and visual characteristics. To illustrate the significance of color-based context, consider the following exemplary implementation. In a project management scenario, the SaaS platform 100 utilizes color-coding to convey task status information. For instance, the text "In Progress" may appear in different colors to indicate varying levels of urgency or attention required. When displayed in yellow, it signifies that the task is actively being worked on but not urgent. The same text rendered in red, however, alerts users that the task is behind schedule and requires immediate attention. Without this color-based differentiation, both instances would appear identical, potentially leading to critical misinterpretations of task priorities.

Another example is in financial reporting applications, the SaaS platform 100 can be configured to employ color to represent performance metrics relative to predefined targets or historical data. Numerical values, such as revenue figures, can be dynamically color-coded. For example, black text might indicate performance within expected parameters, green text could signify exceeding targets, while red text would alert users to performance below expectations. Thus, a value like "$500,000" carries significantly different implications depending on its color, providing instant insights that would not be immediately apparent in a monochromatic display.

This color-context capability serves as the foundation for advanced context related data analysis within the SaaS platform 100. The tabular data structure, along with its rich color-based contextual information, is displayed to the user through the SaaS platform interface or other cloud-based business software environments. This implementation enables users to visually interact with the data, leveraging the additional layer of information provided by the color-coding to make more informed and rapid decisions based on complex data sets.

As shown at 403 a generative AI model may be maintained. This model is specifically adapted to be prompted with at least a portion of the tabular data structure, enabling processing and analyzing the structured data effectively. The generative AI model can be trained based on a history of color-context interpretations. The historical data maintenance is implemented using a time-series database that stores past color-context interpretations. This database can be periodically used to retrain and fine-tune the generative AI model, implementing a form of continual learning that improves performance over time.

At 404, the system receives a first user query. This query pertains to a selected portion of the tabular data structure, indicating the user's initial area of interest within the data.

The system then proceeds to 405, where it queries the generative AI model with the selected portion. This query results in the acquisition of a first contextual output, representing the generative AI environment 200's initial interpretation of the data without color context.

In 406 the system receives a user input that associates at least one component of the selected portion with a color. This color association adds a new layer of context to the data. 404 and 406 may utilize event-driven programming to capture user inputs. In some cases, the generative AI environment 200 may employ a pixel-perfect selection algorithm that can identify and record the exact pixels marked by the user, translating these selections into precise data ranges within the tabular structure. In other cases, the color is derived from the database as one of the data characteristics of a datapoint.

Optionally, the generative AI model's configuration may allow it to interpret identical alphanumeric values differently based on their associated color properties within the tabular data structure.

Optionally, relationships between color-associated components and non-color-associated components within the selected portion are analyzed. This analysis derives additional context, further enriching the generative AI environment 200's interpretation of the data.

Optionally, the generative AI model is trained to recognize common color-coding conventions used in various industries or project management methodologies. In some cases, the color-coding conventions cab ne recognized globally, or be recognized based on a local use in an account. This training enhances the model's ability to provide relevant and accurate interpretations across different domains.

Following this color association, at step 407, the system again queries the generative AI model. This time, the query includes the color-associated selected portion. The result is a second contextual output that takes into account the newly added color information. The difference between the first and second outputs is recognized within the generative AI model's processing pipeline, specifically in its interpretation layer. This layer is designed to consider both the textual content and the associated color metadata when generating contextual outputs.

For example, consider a project management scenario where a user selects a column of task statuses (such as column 342 in FIG. 1B). In the initial query (step 405), without color association, the AI model might provide a generic summary of task distribution. However, after color association (step 407), the model's interpretation can be changed significantly.

An exemplary initial output (step 405), can read: "The selected column contains 10 tasks: 4 are marked as 'In Progress', 3 as 'Completed', and 3 as 'Pending'.". An exemplary color-associated output (step 407) can read: "The selected column indicates varying levels of urgency among 10 tasks. 4 tasks marked 'In Progress' are color-coded yellow, suggesting normal progression. However, 3 'Pending' tasks are highlighted in red, indicating critical delays requiring immediate attention. The 3 'Completed' tasks in green suggest successful on-time completion.".

In the above example, the color association enables the AI model to provide an actionable interpretation of the data, recognizing urgency levels and potential issues that were not apparent from the text alone. This enhanced contextual understanding allows offering more valuable insights and recommendations to the user, demonstrating the significant impact of color-based context in data analysis within the SaaS platform. The difference between the first and second outputs is directly associated with the color of the component(s) in the tabular data structure. This difference demonstrates how color context can significantly alter the generative AI environment 200's interpretation and analysis of the data. This process allows using color not just as a visual element but as a meaningful context that can influence AI-driven insights. It allows for more nuanced and potentially more accurate interpretations of structured data, opening up new possibilities for data visualization and analysis in various fields.

405 and 407 may involve data preprocessing wherein the selected portion of the tabular structure is converted into a tensor representation that preserves both the alphanumeric values and color information. The generative AI model may generate high-dimensional embeddings for the input data, capturing both semantic and visual features. Attention mechanisms within the model may set to focus on relevant parts of the input, considering color-based relationships and to produce a contextual output using a decoder structure, which can be fine-tuned to generate different types of insights or recommendations. While referred to separately, 405 and 407 can be combined, can be practically implemented as a single query detailing both textual content and color context.

The ability to interpret the same alphanumeric value differently based on color may be achieved through numerous methods. For example, by using a multi-modal fusion approach that combines separate neural pathways for processing numeric data and color data, which are then integrated in higher layers of the network to produce a unified interpretation. A generative adversarial network (GAN) component may be utilized, for instance a GAN trained to understand existing color schemes and to generate new color recommendations within the context of the data.

Following step 407 in FIG. 4, the system may identify an area in a display, for example a plurality of pixels, marked by the user, defining color attributes for a specific region of the tabular data structure. It then queries the generative AI model with both the selected portion and these color attributes, acquiring additional contextual information. Based on this information, the system calculates instructions to color another region of the tabular data structure and executes these instructions. This allows to extrapolate color-based insights to other parts of the data.

If required, after step 407, recommendations for contexed based color usage may be generated based on the generative AI model's interpretation of existing color context within the tabular data structure. This feature allows the generative AI environment 200 to suggest optimal color coding for data visualization and interpretation.

For example, the generative AI agent can be configured to suggest color coding for unmarked portions of the tabular data structure based on its interpretation of existing color-coded sections. This proactive action extends the color-context analysis beyond user-defined areas, enhancing data visualization and interpretation across the entire tabular structure.

For example, consider the tabular structure shown in FIG. 2B, which represents a project management board. In this scenario, the "Status" column has been partially color-coded by the user:

1. "Completed" tasks are marked green
2. "Stuck" tasks are marked red
3. "Waiting for other" tasks are marked orange.

However, some rows in the "Status" column remain unmarked. The generative AI agent, upon analyzing the existing color-coded sections, can suggest extending this color scheme to the unmarked areas. The process would work as follows:

1. The AI agent analyzes the existing color-coded cells in the "Status" column, recognizing the pattern: green for completed tasks, red for blocked tasks, and yellow for in-progress tasks.
2. For the unmarked cells in the "Status" column, the AI agent examines the textual content and context of each cell.
3. Based on this analysis, the AI agent suggests appropriate colors for the unmarked cells. For instance:
   A task with the status "Under review" might be suggested to be colored orange, indicating it is near completion but not yet done.
   A task marked "Not started" might be suggested to be colored blue, signifying it's planned but not yet in progress.
4. The AI agent may present these suggestions to the user, possibly through a pop-up interface similar to the one shown in FIG. 2B (element 215), but tailored for color suggestions.
5. The interface could display previews of how the table would look with the suggested color coding applied, allowing the user to accept, modify, or reject the suggestions.
6. If accepted, the system applies the suggested color coding to the previously unmarked cells, creating a consistent color scheme across the entire "Status" column.

Reference is also made to FIG. 5 that illustrates a flowchart depicting a computer-implemented process for generating interactive elements in a messaging session, leveraging an AI agent utilized as a chatbot that is capable of utilizing graphical representations of UI elements in its output, according to some embodiments of the present invention. This process enhances user interaction with tabular data through an AI-driven messaging interface, and increasing clarity of alphanumeric data in the messaging interface while concurrently providing context thereto. The process is optionally executed using the generative AI environment 200 or by the exemplary SaaS platform 100 and the generative AI environment 200.

As shown at 501, the SaaS platform 100 displays data in a tabular structure. This structure comprises a plurality of interactive cells, each possessing distinct graphical characteristics such as color, font, borders, or icons.

As shown at 502 a messaging session is maintained with a generative AI agent within a messaging GUI element. This messaging interface serves as the primary interaction point between the user and the AI agent.

As shown at 503, the generative AI environment 200 identifies a query about the tabular structure within the messaging session. This could be a natural language query typed by the user or selected from predefined options. The query, as well as the entire messaging session, can occur within the SaaS platform on which the tabular structure is displayed, or in a different third-party app.

As shown at 504, the generative AI environment 200 involves prompting a generative AI model with the identified query. The generative AI model, trained on both textual and visual data, processes the query in the context of the tabular structure. Optionally, the generative AI model is specifically trained to recognize and replicate graphical characteristics. It can be configured to employ a combination of computer vision techniques and style transfer learning to analyze the visual aspects of the tabular structure. The model uses this analysis to generate visually consistent interactive elements, essentially functioning as an AI-driven UI designer.

Optionally, the generative AI model can be configured to incorporate a color interpretation module. As described above. Shortly, this module can be configured to analyze the color-based context in the tabular structure using color theory algorithms and domain-specific knowledge bases. The interpreted color context influences both the content and appearance of the generated interactive elements, ensuring that color-based meanings are preserved and reflected.

As shown at 505, the generative AI environment 200 uses the generative AI model for generating a response that is associated with a subgroup of the plurality of interactive cells. This response is based on the model's understanding of the query and its analysis of the tabular data.

As shown at 506, an interactive element is generated within the messaging GUI element. In some cases, in addition to the textual response, the interactive element also includes a graphical, interactive representation of at least one UI element from one or more of the tabular structures that are associated with the query. In such cases, the interactive element can be configured to mimics the structure and/or visual characteristics of the referenced one or more cells. In some cases, the interactive element is a mirrored instant of the one or more cells, that function identically to the same one or more cells in the corresponding table.

Optionally, the system ensures that the generated interactive element mimics the common graphical characteristics of the corresponding cells in the tabular structure. These characteristics include color schemes, font types and sizes, and overall styling. This visual consistency is achieved through a style transfer algorithm that extracts and applies the relevant CSS properties.

In some embodiments, the generative AI agent is capable of generating multiple interactive elements within a single message response. Each of the interactive element can be configured to correspond to a different subgroup of the tabular structure, allowing for complex, multi-faceted interactions. This is achieved through a modular generation approach where each interactive element is created independently but with awareness of the others.

As shown at 507 the generated interactive element may share common graphical characteristics with the corresponding member(s) of the subgroup it represents. This visual consistency helps users quickly associate the interactive element with the relevant data in the table.

As shown at 508, the system may add the interactive element as part of the message response in the messaging session. This integration allows users to interact with and modify data directly within the messaging interface.

Optionally, the system implements a real-time data synchronization mechanism. This mechanism may operate in one or both of the following modes:

System-Initiated Command Mode: In this mode, the interactive elements can trigger pre-defined system commands. For example, an interactive element might include a button labeled "Set to 5," which, when activated, instructs the system to change a specific value in the underlying data structure to 5. This mode allows for rapid, predefined data manipulations without requiring direct user input of values.

User-Driven Manual Edit Mode: the interactive elements can provide user interface components that allow direct manual editing of data values. For instance, an interactive element might present an editable text field where the user can input a new value for a specific data point.

In both modes, when a user may interact with these elements to modify a value, whether through a system-initiated command or manual edit, the change is immediately propagated to the underlying tabular structure. This propagation is accomplished through WebSocket connections or a similar real-time communication protocol, ensuring data consistency across all views of the SaaS platform.

As described in preceding sections of this disclosure, the interactive elements generated within the messaging interface may not be mere representations of the data, but rather function as instances of the cells from the original tabular structure. These instances are implemented as pointers to the corresponding entries in the database. This architecture ensures that any modifications made through the interactive elements in the messaging interface directly affect the source data, maintaining a single source of truth across the entire system.

Optionally, the system continuously monitors user interactions with the generated interactive element. It can provide context-aware suggestions or validations using a separate inference model that considers the current state of the data, historical interactions, and predefined business rules. These suggestions appear as tooltips or inline messages within the messaging GUI.

The generative AI model ability to utilize graphical representations of UI elements in its output is central to this process. It enables the generative AI environment 200 to create rich, visually consistent interfaces that bridge the gap between conversational interaction and data manipulation. By replicating the graphical characteristics of the original tabular structure, the bot ensures that users can seamlessly transition between viewing data in the table and interacting with it in the messaging session.

Optionally, the system maintains an interaction history database that records all user interactions with the generated interactive elements. This historical data is used to periodically retrain and fine-tune the generative AI model, implementing a feedback loop that continuously improves the model's response quality and relevance.

Optionally, the entire process depicted in FIG. 5 is integrated into a Software as a Service (SaaS) platform interface. This integration allows for seamless data flow between the messaging component and other platform services, leveraging cloud-based resources for scalability and performance. This process represents a significant advancement in AI-driven user interfaces, combining the intuitiveness of chat interactions with the power of direct data manipulation, all while maintaining visual consistency across different interface elements.

Reference is now also made to FIG. 6 that illustrates a flowchart depicting a computer-implemented process for operating a software as a service (SaaS) platform, with a focus on cross-application generative AI agent interaction triggered by user mentions, according to some embodiments of the present invention. The process is optionally executed using the generative AI environment 200 or by the exemplary SaaS platform 100 and the generative AI environment 200. As used herein, a cross-application generative AI agent interaction is a capability within a SaaS platform where a generative AI agent can perform actions or access information across multiple applications or platform elements based on a single user interaction or command. This allows for seamless integration of AI assistance across different components of the SaaS ecosystem, enabling more efficient and comprehensive task completion without requiring the user to switch between different applications manually.

As shown at 601, a messaging session with a generative AI agent is maintained, for instance by the generative AI environment 200. This messaging session serves as an interface for user-AI interaction within the SaaS platform. The generative AI agent may be a generative AI agent as described in co-filed application titled methods for implementing artificial intelligence capabilities in software applications PCT Patent Application No. PCT/IL2024/050820 having International filing date of Aug. 14, 2024) which is incorporated herein by reference.

At 602, the system identifies a section of text message issued by a user that textually refers to an alphanumeric identifier of the generative AI agent in a first platform element.

This identification may be triggered for example by the use of an "@" sign followed by the generative AI agent's name in the chat interface of the first application. The system may use a regular expression parsing to identify these mentions in real-time as users type in the messaging interface.

Optionally, when the generative AI agent's identifier is recognized, the system initiates a secure authentication process. This process involves generating temporary credentials or tokens for the generative AI agent, allowing it to access the messaging session and relevant platform elements. These credentials are managed by a secure key management service and are time-limited for enhanced security.

The generative AI agent's capability to perform actions across multiple platform elements from a single mention as described herein may be implemented through a task decomposition and routing system. This system may break down complex instructions into atomic tasks, determine the relevant platform elements for each task, and manage the execution flow across these elements. The system may use a combination of rule-based logic and machine learning models to optimize task distribution and execution.

At 603 text and platform elements in a certain platform element are used to identify one or more user instructions in the messaging session. The system employs natural language processing (NLP) techniques to parse the user's message and extract actionable instructions.

In 604, the system identifies references to one or more platform elements other than the certain platform element that are associated with the instructions. This step is crucial for enabling cross-application functionality, as it determines which other applications or elements within the SaaS platform need to be accessed or modified.

In the context of step 604, the system may employ a microservices architecture that allows different applications within the SaaS platform to communicate. Each application may expose a standardized API, enabling the generative AI agent to interact with them seamlessly. This cross-application functionality is managed by an orchestration layer that routes requests and data between applications.

For scenarios where the certain platform element and other elements are within the same application, the system may utilize an intra-application communication framework. This framework allows different modules or components of the application to interact, leveraging shared memory or internal messaging queues for efficient data exchange.

At 605 a generative artificial intelligence (AI) model associated with the generative AI agent is being prompted. This model is tasked with generating SaaS platform instructions for changing one or more values in the identified platform elements, in accordance with the user instructions.

Optionally, the generative AI model is trained on a diverse dataset that includes examples of cross-platform interactions and context. It uses transfer learning techniques to apply knowledge from one platform element to another, and employs attention mechanisms to focus on relevant contextual cues across different elements.

Optionally, the system maintains a dedicated database for storing the history of cross-platform actions triggered by generative AI agent mentions. This historical data may be used in a continuous learning pipeline that periodically retrains the generative AI model, using techniques like incremental learning to improve its performance over time.

At 606, the system executes the SaaS platform instructions generated by the generative AI model. This execution may involve API calls to different applications within the SaaS ecosystem, database updates, or other programmatic actions to effect the requested changes.

Optionally, the system generates a visual representation of the affected platform elements. This visualization is created using a dynamic rendering engine that can produce interactive diagrams or flowcharts. It leverages data from the executed instructions to show before-and-after states of the modified elements.

In 607, the system notifies the user of the execution. This notification may be sent back through the original messaging session, closing the interaction loop.

The notification process in step 607 is enhanced with a context-aware notification system. This system determines the most appropriate platform element for sending the notification based on user preferences, current active sessions, and the nature of the executed action. It uses a publish-subscribe model to ensure notifications are delivered in real-time.

Optionally, the notification is extended to include detailed messaging within the original messaging session. The system generates a structured message that outlines the changes made, optionally using a template engine to format the information clearly and consistently.

In this process actions may be triggered in one application (or multiple applications) by mentioning the generative AI agent in another application. This is achieved through a cross-application communication layer that allows the generative AI agent to seamlessly operate across different elements of the SaaS platform.

The generative AI agent's ability to understand context across different applications is powered by a unified data model that represents the entire SaaS ecosystem. This model allows the generative AI environment 200 to make informed decisions about how to interpret and execute user instructions, even when they involve multiple platform elements. This process represents a significant advancement in SaaS platform operation, enabling more natural and efficient user interactions by allowing users to initiate complex, cross-application workflows through simple chat commands. It leverages the power of AI to bridge the gaps between different platform elements, creating a more integrated and responsive user experience.

Reference is now also made to FIG. 7 that illustrates a flowchart depicting a computer-implemented process for using generative artificial intelligence for intent-based interaction with a SaaS platform, focusing on the AI-driven creation of platform elements based on user requirements. The process is optionally executed using the generative AI environment 200 or by the exemplary SaaS platform 100 and the generative AI environment 200.

As shown at step 701, a plurality of task tables are maintained for instance by the exemplary SaaS platform 100. Each task table contains multiple items, with each item defined by a row of cells, and each cell associated with a specific workflow step. This structured data forms the foundation for the generative AI environment 200's understanding of workflow processes within the SaaS platform.

Optionally, the exemplary SaaS platform 100 maintains a plurality of task tables, each containing multiple items. Each item is defined by a row of cells, with each cell associated with a specific workflow step. This structured data forms the foundation for the generative AI environment 200's understanding of workflow processes within the SaaS platform. The task tables are stored in a distributed database system, allowing for efficient access and real-time updates.

At 702, a generative AI model is maintained for instance by the AI environment system 200. This model is trained based on analysis of interactions with alphanumeric data stored in the plurality of task tables, enabling it to understand patterns and relationships within the workflow data.

Optionally, a natural language processing (NLP) module is used to receive and interpret natural language requests to build platform elements. This module uses advanced language models (e.g., BERT or GPT) to parse the request and extract key information. The generative AI model then analyzes this parsed data in the context of the existing SaaS environment to deduce the main requirements of the requested platform element.

Optionally, the generative AI model maintenance includes a feedback loop mechanism. This mechanism collects user feedback and usage data of created platform elements, using techniques like A/B testing and user behavior analytics. The collected data is then used to fine-tune the generative AI model through techniques such as reinforcement learning and online learning.

Optionally, the generative AI model is maintained using a transformer-based architecture such as GPT (Generative Pre-trained Transformer). This model is continuously trained using federated learning techniques on the alphanumeric data stored in the task tables. The training process involves:

1. Data preprocessing: Cleaning and normalizing input data
2. Embedding generation: Creating dense vector representations of task table elements
3. Self-supervised learning: Predicting masked elements in the task tables
4. Fine-tuning: Adjusting the model based on specific SaaS platform use cases The model uses attention mechanisms to understand patterns and relationships within the workflow data, enabling it to generate contextually relevant platform elements.

At step 703, the system receives a user selection indicative of a desired platform element to be added to the SaaS platform. This could be a natural language request or a selection from predefined options. Optionally, a user selection indicative of a desired platform element to be added to the SaaS platform is received. This input is processed through a natural language understanding (NLU) module, which uses named entity recognition and intent classification to interpret the user's requirements.

Optionally, the NLU module or any generative AI agent described herein identify user intent through various forms of input, moving beyond traditional command-based interactions. This intent-based user interface allows for a more natural and intuitive interaction between the user and the software platform.

The generative AI agent (or NLU) module are capable of processing inputs in multiple formats, including natural language text, voice commands, gestures and actions within the user interface, and/or selections of UI elements. When a user provides input through any of these methods, the generative AI agent analyzes the input to determine the user's underlying intention. This analysis can take into account not only the literal content of the input but also the context of the user's current task, historical interactions, where the query initiated from, and the overall state of the account in the platform.

For example, if a user selects a status column in a project management board and says "change this to steps 1 through 7", the generative AI agent understands that the intention is to convert text-based status descriptions into a numerical sequence. It can then proceed to implement this change without requiring the user to specify the exact steps or use predetermined commands.

In cases where the user's intent is not immediately clear, the generative AI agent may be programmed to engage in a clarifying dialogue. It may ask follow-up questions or present options to the user, ensuring that it accurately understands and executes the desired action. This iterative process allows for a more collaborative and responsive interaction between the user and the generative AI agent.

Moreover, the generative AI agent can interpret non-textual inputs as indicators of intent. For instance, assigning the generative AI agent to a specific item in a table might be interpreted as granting permission to access and manage that item's data. This ability to infer intent from actions allows for more efficient workflows and reduces the need for explicit instructions.

The intent-based UI also allows the generative AI agent to import or simulate familiar UI elements from other applications when needed. This feature can help users provide input in a context they're accustomed to, further streamlining the interaction process.

By leveraging this intent-based approach, our generative AI agent can function more like a knowledgeable colleague than a tool, understanding and executing complex tasks based on natural human communication. This significantly reduces the learning curve for new users and increases overall productivity by allowing users to focus on their goals rather than on how to operate the software. Moreover, this process can be extended to handle complex, multi-element interactions within the SaaS platform. For instance, when a user requests to "build me a board to manage supply for a company X" the generative AI environment 200 doesn't merely create a simple, isolated board. Instead, it intelligently chooses and integrates the right components across multiple platform elements. These components are selected not only for their individual functionalities but also for their potential to work together synergistically. The generative AI environment 200 considers how automations can utilize the data in these various platform elements to create a fully automated, interconnected board. This holistic approach results in a comprehensive solution that anticipates the user's needs, incorporating data flows, automated processes, and intelligent insights across multiple aspects of supply management for company X. By understanding the broader context and potential of the request, the AI agent delivers a solution that is greater than the sum of its parts, further exemplifying its role as a sophisticated, context-aware collaborator in the SaaS environment.

At 704, the generative AI model is used to calculate instructions for adding the platform element, for instance based on the intent. Here, the main requirements of the requested platform element in the context of the user's request are deduced. The existing workflow structures (i.e., project management pipelines, task assignment hierarchies, approval processes, data input forms, reporting dashboards, and integration points with external systems), and user interactions may be analyzed to understand the intent behind the request.

Following the deduction, the generative AI model may employ a hierarchical task decomposition algorithm. This algorithm breaks down the main requirement into specific functionalities and data display needs. It utilizes a knowledge graph that maps relationships between different SaaS platform functionalities and data types to ensure comprehensive coverage of the deduced requirements.

Optionally, when the generative AI model is prompted with the processed user requirements, it employs a multi-step reasoning process for understanding the existing workflow structures, breaking down complex requirements into atomic tasks, matching required functionalities to existing platform capabilities, and proposing new elements where existing ones don't suffice. The model may output a set of instructions for adding the platform element, formatted in a domain-specific language interpretable by the SaaS platform's execution engine.

In 705, one or more workflow steps are implemented by two or more platform elements. This step involves breaking down the deduced requirements into specific functionalities and determining what data should be shown to satisfy these requirements. The system executing the process may identify one or more workflow steps by two or more platform elements involving functional decomposition of the workflow step, capability matching with existing platform elements and/or compatibility analysis between potential implementing elements.

At 706, the generative AI model is utilized to calculate which of the two or more platform elements would be most suitable for the workflow in the SaaS platform context. The generative AI environment 200 considers factors such as user preferences, existing workflow structures, and platform capabilities to make this determination.

Optionally, the analysis is used to determine the most suitable platform elements. It uses a multi-criteria decision-making algorithm that considers factors such as functionality match, performance metrics, user preferences, and integration complexity. This algorithm generates a scoring matrix for potential elements and selects the optimal combination.

Optionally, a preview of the platform element is generated and presented to the user, for instance using a sandboxed environment. This preview is presented to the user through an interactive interface. User feedback is collected via a structured feedback mechanism, which is then analyzed by the generative AI model. The model uses this analysis to adjust its instructions, potentially triggering a re-execution of 705 and 706 if changes are needed.

Optionally, the generative AI model calculates which of the identified platform elements would be most suitable for the workflow. This calculation may involve a multi-criteria decision analysis considering factors such as functional fit, user preferences. performance metrics, and/or integration complexity. Monte Carlo simulations may be used to predict the effectiveness of different element combinations. A/B testing recommendations for ambiguous cases may be used.

In case where several elements are to be added—the ones that are chosen are selected by their ability to be used in automation later/in accordance with how other accounts used them.

In 707, the instructions to implement the platform element are performed. This involves constructing the new element using the selected components, integrating it into the existing workflow, and ensuring it meets the deduced requirements.

Optionally, constructing the new element involves an automated build process wherein a component-based architecture is used where platform elements are modular and can be dynamically assembled. A build orchestrator manages the process, using dependency injection to combine the determined suitable elements into a cohesive new platform element.

Optionally, the platform elements referred to herein are implemented as flexible, multi-purpose components. Boards are implemented as Kanban-style interfaces, dashboards as customizable data visualization panels, and workflows as directed graph structures representing process flows. Each type is built on a common framework allowing for consistent integration and interaction within the SaaS platform.

Optionally, a detailed instruction set for adding the platform element is used. This involves a layout engine for arranging visual components, a data binding system for configuring data sources, and an event-driven programming model for setting up interactive features. These systems work together to create a fully functional and integrated platform element.

Optionally, the system executing the process executes the calculated instructions to implement the platform element by element instantiation in a sandboxed environment, integration with existing workflow structures, data binding and state management setup, user interface generation, automated testing of the new element and/or gradual rollout with real-time monitoring for any issues.

The intent-based user interface, combined with the generative AI model-based functionalities ensures that the AI model continually enhances its role as an expert collaborator, providing increasingly valuable assistance as it gains more context and understanding of user preferences and workflows.

This process may be implemented as a continuous learning pipeline that runs parallel to the main process flow. This pipeline constantly monitors user interactions with created platform elements, collecting usage data, performance metrics, and explicit user feedback. This data is used to update the generative AI model through techniques like incremental learning and adaptive boosting, ensuring the model's recommendations and builds improve over time. These technical implementations ensure that the SaaS platform can efficiently handle complex, user-intent driven creation of platform elements. The system's ability to understand natural language requests, deduce complex requirements, and autonomously construct and refine suitable platform elements represents a significant advancement in AI-driven SaaS platform customization and expansion.

This process provides an ability to understand user intent, deduce complex requirements, and autonomously construct suitable platform elements. The generative AI environment 200 acts as an intelligent system architect, capable of designing and implementing custom workflow solutions based on high-level user inputs. This approach leverages the generative AI environment 200's deep understanding of the SaaS platform's structure and capabilities, allowing it to create tailored solutions that seamlessly integrate with existing workflows. By automating the process of platform element creation, it significantly reduces the time and expertise required to extend and customize the SaaS platform, enabling more agile and responsive business processes.

In one embodiment of the present invention, the system's ability to choose between multiple potential implementations for each workflow step is demonstrated in the context of a customer relationship management (CRM) process within a SaaS environment.

For instance, consider a workflow step labeled "Lead Qualification." The generative AI model, upon analyzing the user's specific SaaS environment, historical data, and current requirements, may identify multiple potential implementations for this, for instance a rule-based scoring system, a machine learning-based predictive model and/or a hybrid approach combining human input with automated scoring.

The generative AI model then evaluates these options based on various factors, including but not limited to:

a) The volume of lead data available in the user's system b) The complexity of the user's sales cycle
c) The accuracy requirements specified by the user
d) The available computational resources in the user's SaaS environment
e) The level of human expertise available for lead qualification After this comprehensive analysis, the system might determine that for this particular user, the hybrid approach (option 3) is optimal. This decision could be based on the generative AI environment 200's assessment that while the user has sufficient data for some automation, their sales cycle complexity requires human insight for optimal results.

The generative AI environment 200 then proceeds to implement this hybrid approach by:

generating a machine learning model to provide initial lead scores, creating an interface for sales representatives to review and adjust these scores, and/or implementing a feedback loop where human adjustments are used to continually improve the machine learning model.

Reference is now also made to FIG. 8 that illustrates a flowchart depicting a computer-implemented process for using generative artificial intelligence to create custom SaaS platform products by combining functionalities from existing products. This process leverages the concept of instant product by functionality to create tailored solutions based on client requirements. This embodiment of the present invention may be based on a SaaS platform architected on a modular structure, comprising a series of specialized building blocks that form the foundation of each product within the platform. This modular architecture can be conceptualized as a sophisticated "digital Lego" system, where each block represents a distinct functionality or feature.

The platform's architecture may include a Core Framework serving as the base layer upon which all products are built. This framework encompasses essential services such as user authentication, data storage, and basic UI rendering. Atop this foundation, the system implements Functional Modules, which are self-contained units of functionality that can be combined to create various products. These modules may include, but are not limited to, Data Visualization, Workflow Automation, Reporting and Analytics, Communication and Collaboration, and Integration and API functionalities.

Further enhancing the platform's capabilities are Product-Specific Modules, which are specialized building blocks designed for specific products within the SaaS platform. For example, a CRM product might incorporate Lead Scoring and Sales Pipeline modules, while a Project Management product could utilize Gantt Chart and Resource Allocation modules. The architecture also incorporates a Customization Layer, allowing for the fine-tuning and adaptation of modules to meet specific client needs.

Optionally, to support the functionality of this modular system, an Inter-module Communication Protocol is used, providing a standardized method for modules to interact and share data. This protocol ensures seamless integration regardless of the combination of modules used, thereby maintaining system cohesion and efficiency.

The generative AI environment 200 interacts with this modular structure, for example through a multi-step process. Initially, it analyzes client requirements and maps them to existing functional and product-specific modules. Subsequently, it identifies optimal combinations of these modules to fulfill the client's needs. The generative AI environment 200 then utilizes the customization layer to adjust modules as necessary, ensuring a tailored fit for the client's specific requirements. Finally, the generative AI environment 200 employs the inter-module communication protocol to ensure all selected modules work harmoniously within the newly created product.

This modular approach, when coupled with the generative AI environment 200's capability to intelligently select and combine modules, allows for the rapid creation of highly customized SaaS products. It enables the system to leverage existing, well-tested components while still providing a tailored solution, significantly reducing development time and ensuring reliability.

Moreover, this architecture facilitates easy updates and expansions of the platform's capabilities. New modules can be seamlessly integrated into the system, immediately becoming available for the generative AI environment 200 to incorporate into future custom products.

This embodiment of the present invention thus represents a significant advancement in the field of SaaS platform development and customization, offering unprecedented levels of flexibility, efficiency, and adaptability in creating bespoke software solutions.

The process is optionally executed using the generative AI environment 200 or by the exemplary SaaS platform 100 and the generative AI environment 200.

As shown at 801, a plurality of products are maintained within the SaaS platform 200. Each product contains a set of unique, product-specific functionalities. These functionalities are built on a common base, referred to as WorkOS, which provides a consistent foundation for all products.

Optionally, a collaborative development environment is executed by the system 200 or the platform 100 to allow users to be assigned to specific products and to create and modify functionalities. This environment uses version control and merge request systems to manage user-created functionalities, ensuring they integrate seamlessly with the product ecosystem.

As shown at 802, the system 200 receives an input, including specification of requirements for a new SaaS platform product. For example, this input may be in the form of a detailed brief or a set of desired features and outcomes.

Optionally, a natural language processing (NLP) module can be applied to analyze the specification. The analysis may be a semantic analysis and keyword extraction techniques may be applied to identify key functionalities required, creating a structured representation of the requirements for the generative model to process.

As shown at 803 a generative AI model is prompted with the user specification. This generative AI model has been trained on comprehensive data documenting the existing plurality of products and their functionalities. The generative AI model's task is to identify required functionalities for the new product, drawing from two or more of the existing products.

Optionally, the generative model in step 803 is trained using a combination of supervised learning on labeled product data and unsupervised learning techniques like clustering to recognize unique functionalities. It employs attention mechanisms to focus on distinctive features across different products.

As shown at 804, instructions to assign the required functionalities to the new SaaS platform product are calculated. These functionalities originate from at least two different existing products, allowing for novel combinations that best fit the client's requirements.

Optionally, as shown at 804, a constraint satisfaction algorithm is used to ensure that the selected functionalities collectively fulfill the new product requirements. This algorithm considers interdependencies between functionalities and optimizes for complete requirement coverage.

Optionally, the instructions include a data structure adaptation module. This module uses schema mapping and data transformation techniques to ensure that the data structures of different functionalities can work together cohesively in the new product environment.

Optionally, the generative AI environment 200 executing the process activates a recommendation engine that analyzes the selected functionalities and compares them against the full product catalog. Using collaborative filtering and association rule learning, it suggests additional complementary functionalities that could enhance the new product.

Optionally, the generative AI environment 200 executing the process performs compatibility checks using a rule-based expert system. This system identifies potential conflicts between selected functionalities and employs a resolution engine that suggests alternatives or modifications to ensure compatibility.

At step 805, the generative AI environment 200 executing the process executes the calculated instructions to create the new product. This process provides an ability to mix and match functionalities from different products to create a custom solution. For example, the system could combine work management features with email tracking capabilities from a CRM to create a specialized docketing feature for a law firm product.

Optionally, the generative AI environment 200 executing the process employs a UI generation engine that creates a cohesive interface for the new product. This engine uses design principles and templates from existing products, recognizing that the UI design itself is a building block used by the platform. This approach treats UI components as modular, reusable elements within the SaaS ecosystem. The UI generation engine can dynamically assemble these UI building blocks, adapting them to the specific needs of the new product while maintaining consistency with the platform's overall design language. This modularity in UI design allows for rapid prototyping, easy customization, and seamless integration of new functionalities into existing interfaces. Moreover, the UI generation engine enables the described environment to create intuitive, familiar interfaces for new products by leveraging UI patterns that users are already accustomed to from other parts of the platform. This not only accelerates the product creation process but also enhances user adoption by providing a consistent and familiar user experience across different products within the SaaS platform.

Optionally, the generative AI environment 200 executing the process is built on a modular architecture that allows for dynamic adjustments post-creation. It includes a runtime functionality manager that can add or remove functionalities on-the-fly, using dependency injection and hot-swapping techniques to modify the product without downtime.

Optionally, the generative AI environment 200 executing the process employs an automated documentation generator. This tool creates comprehensive documentation for the new product, using natural language generation techniques to explain the combination of functionalities and provide usage instructions.

This approach is made possible by the modular architecture of the SaaS platform, where each functionality is a self-contained unit that can be plugged into different products. The WorkOS base ensures compatibility and consistency across all products and functionalities.

The generative AI model allows understanding the user requirements and mapping them to the most suitable combination of existing functionalities. It considers factors such as feature compatibility, user experience coherence, and overall product efficacy when making its selections.

The generative AI environment 200 may incorporate a dynamic pricing model, where the cost (or "seat charge") is based on the number and complexity of features included in the custom product. This allows for flexible and fair pricing that aligns with the value provided to the client.

By automating the process of product creation through AI-driven functionality combination, this generative AI environment 200 may reduce the time and resources required to develop new, tailored SaaS products. It enables the platform to rapidly respond to specific client needs without the need for extensive custom development, while still providing highly personalized solutions.

Optionally, the generative AI environment 200 executing the process incorporates a dynamic licensing cost calculator that runs parallel to the main process. This calculator uses a weighted scoring system based on the complexity and value of each included functionality to determine the final licensing cost for the new product.

Optionally, a multi-objective optimization algorithm is used to select functionalities that collectively fulfill the new product requirements. This algorithm considers factors such as feature coverage, user experience coherence, and potential synergies between functionalities.

Optionally, a functionality customization engine is used with parameterized templates and code generation techniques to adapt each required functionality to the specific needs of the new product, modifying data models, business logic, and UI components as necessary.

Optionally, a dynamic pricing engine is runs parallel to the main process. This engine uses machine learning models trained on historical pricing data to calculate a fair and competitive licensing cost based on the number, type, and complexity of functionalities included in the new product.

Optionally, the calculated instructions include a data structure adaptation module. This module uses schema matching algorithms and automated ETL (Extract, Transform, Load) processes to ensure that the data structures of different functionalities can work cohesively in the new product environment.

Optionally the generative AI environment 200 executes the process activates a recommendation engine powered by a hybrid collaborative and content-based filtering system. This engine analyzes the selected functionalities and user requirements to suggest additional complementary functionalities that could enhance the new product's capabilities.

Optionally the generative AI environment 200 executes the process implements a continuous learning pipeline that uses federated learning techniques to periodically update the generative model. This allows the model to learn from newly created products across different instances of the platform while maintaining data privacy.

At 805, the generative AI environment 200 that executes the process executes the calculated instructions to create the new product. Optionally, generative adversarial networks (GANs) are used to create a cohesive and intuitive user interface that seamlessly integrates the functionalities of the required functionalities, ensuring a consistent user experience.

Optionally, natural language generation models fine-tuned on technical documentation are used to create comprehensive, easy-to-understand documentation for the new product.

In some embodiments, the generative AI environment 200 for using generative artificial intelligence for creating SaaS platform products comprises additional features and functionalities as described in the following paragraphs. Referring again to FIG. 8, in one embodiment, each of the plurality of products (802) maintained by the generative AI environment 200 comprises a plurality of shared functionalities and one or more product-specific functionalities. The shared functionalities may include common features across multiple products, such as user authentication, data storage, or basic reporting capabilities. Product-specific functionalities are unique to each product and may include specialized tools or features tailored to specific use cases or industries.

In another embodiment, the input received by the generative AI environment 200 (803) comprises a specification of user requirements for the new SaaS platform product. This specification may be in the form of natural language descriptions, structured data, or a combination thereof. The generative AI environment 200 is configured to interpret and process this input to guide the creation of the new product.

In a further embodiment, when prompting the generative model (804), the generative AI environment 200 is configured to identify required product-specific functionalities to be included together with shared functionalities in the new SaaS platform product. This process involves analyzing the user requirements and determining which unique features are necessary, in addition to the standard shared functionalities, to meet the specified needs.

In yet another embodiment, the one or more processors are further configured to perform additional steps in the product creation process. Specifically, the generative AI environment 200 identifies two or more overlapping functionalities from the required functionalities. These may be features that serve similar purposes but originate from different existing products. The generative AI environment 200 then utilizes the generative model to determine which of the overlapping functionalities should be included in the new SaaS platform product. This determination may be based on factors such as efficiency, user experience, compatibility with other selected functionalities, and alignment with the overall product requirements.

The aforementioned embodiments enhance the generative AI environment 200's ability to create tailored SaaS platform products by intelligently combining and optimizing functionalities from existing products, while ensuring that the new product meets specific user requirements and maintains overall coherence and efficiency.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display)

monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and may interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer-implemented method for operating a software as a service (SaaS) platform, comprising:

maintaining a messaging session with a generative AI agent;

identifying a section of text message issued by a user that textually refers to an alphanumeric identifier of the generative AI agent in a first platform element;

using text and platform elements in the first platform element to identify one or more user instructions in the messaging session;

identifying references to one or more platform elements other than the first platform element that are associated with the instructions;

prompting a generative artificial intelligence (AI) model associated with the generative AI agent to generate SaaS platform instructions for changing one or more values in the one or more platform elements in accordance with the user instructions;

executing the SaaS platform instructions for changing the one or more values; and notifying the user of the execution.

2. The method of claim 1, wherein the first platform element and the other platform elements are different applications within the SaaS platform.

3. The method of claim 1, wherein the first platform element and the other platform elements are different platform elements within the same application of the SaaS platform.

4. The method of claim 1, wherein notifying the user comprises sending a notification in either the first platform element or one of the other platform elements.

5. The method of claim 1, further comprising:

providing a visualization of the other platform elements to the user following the execution of the SaaS platform instructions.

6. The method of claim 1, wherein the alphanumeric identifier of the generative AI agent is a mention symbol followed by the generative AI agent's name.

7. The method of claim 1, further comprising:

providing the generative AI agent with credentials to access the messaging session upon identification of the alphanumeric identifier, where the generative AI agent did not have access to the messaging session before.

8. The method of claim 1, wherein notifying the user comprises adding a message in the messaging session indicative of the performance of changing the one or more values.

9. The method of claim 1, wherein the generative AI model is trained to interpret context across different platform elements or applications within the SaaS environment.

10. The method of claim 1, further comprising:

maintaining a history of cross-platform actions triggered by generative AI agent mentions to improve the generative AI model's future interpretations and actions.

11. The method of claim 1, wherein the generative AI agent is capable of performing actions across multiple platform elements or applications based on a single mention and instruction set in the messaging session.

12. The method of claim 1, further comprising:

detecting ambiguity in the one or more user instructions;

generating a clarifying question using the generative AI model; and presenting the clarifying question to the user in the messaging session before generating the SaaS platform instructions.

13. The method of claim 1, wherein prompting the generative AI model comprises:

providing the generative AI model with schema information about the one or more platform elements; and providing historical interaction data between the user and the SaaS platform as context.

14. The method of claim 1, further comprising:

determining dependencies between multiple changes required across the one or more platform elements; and ordering the execution of the SaaS platform instructions based on the dependencies.

15. A system for implementing the method of claim 1, comprising:

a messaging interface for maintaining the messaging session;

a plurality of platform elements or applications within the SaaS environment;

a processor configured to execute the steps of the method;

a memory for storing the generative AI model and cross-platform action history.

16. A computer-implemented method for permission-controlled cross-platform AI operations in a SaaS environment, comprising:

receiving, in a messaging session, a user message containing an alphanumeric identifier that invokes a generative AI agent and natural language instructions specifying tasks;

extracting the natural language instructions and identifying target platform elements within a SaaS platform where the tasks are to be performed;

retrieving user access permissions for each of the target platform elements;

generating, using a generative AI model, filtered platform commands that respect the user access permissions;

executing the filtered platform commands to modify data in the target platform elements; and providing execution feedback to the user indicating completed actions and any permission-restricted actions.

17. The method of claim 16, wherein retrieving user access permissions comprises querying a role-based access control system of the SaaS platform.

18. The method of claim 16, further comprising:

presenting the filtered platform commands to the user for approval before executing; and receiving user confirmation before proceeding with execution.

19. The method of claim 16, wherein the execution feedback includes hyperlinks to modified data in the target platform elements.

20. The method of claim 16, further comprising:

when a requested action exceeds the user access permissions, automatically suggesting alternative permitted actions that accomplish similar objectives.

* * * * *